United States Patent
Lee et al.

(10) Patent No.: US 9,936,372 B2
(45) Date of Patent: Apr. 3, 2018

(54) METHOD AND DEVICE FOR COMMUNICATION BETWEEN DEVICES IN WIRELESS COMMUNICATION SYSTEM

(71) Applicant: LG ELECTRONICS INC., Seoul (KR)

(72) Inventors: Jaeho Lee, Seoul (KR); Minsoo Lee, Seoul (KR); Younghwan Kwon, Seoul (KR); Hyeonjae Lee, Seoul (KR); Jangwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 14/902,389

(22) PCT Filed: Jun. 9, 2014

(86) PCT No.: PCT/KR2014/005039
§ 371 (c)(1),
(2) Date: Dec. 31, 2015

(87) PCT Pub. No.: WO2015/002385
PCT Pub. Date: Jan. 8, 2015

(65) Prior Publication Data
US 2016/0373914 A1    Dec. 22, 2016

Related U.S. Application Data

(60) Provisional application No. 61/842,952, filed on Jul. 3, 2013, provisional application No. 61/890,853, filed on Oct. 14, 2013.

(51) Int. Cl.
*H04W 8/00*   (2009.01)
*H04W 28/18*   (2009.01)
(Continued)

(52) U.S. Cl.
CPC .......... *H04W 8/005* (2013.01); *H04L 5/0048* (2013.01); *H04W 28/18* (2013.01);
(Continued)

(58) Field of Classification Search
CPC ............. H04W 76/023; H04W 76/043; H04W 28/0215; H04W 84/18
See application file for complete search history.

(56) References Cited

U.S. PATENT DOCUMENTS

2002/0181417 A1*  12/2002  Malhotra .............. H04W 72/02
                                                        370/329
2011/0188391 A1*   8/2011  Sella ..................... H04W 24/10
                                                        370/252
(Continued)

FOREIGN PATENT DOCUMENTS

KR  10-2012-0056533 A   6/2012
KR  10-2013-0029236 A   3/2013

OTHER PUBLICATIONS

D. Camps-Mur, A. Garcia-Saaverds, Device-to-Device Communications with WiFi Direct: Overview and Experimentation, IEEE Wireless Communications, vol. 20, Issue 3, Jul. 1, 2013, pp. 96-104.*

(Continued)

*Primary Examiner* — Christopher Crutchfield
(74) *Attorney, Agent, or Firm* — Morgan, Lewis & Bockius LLP

(57) ABSTRACT

The present invention relates to a method and apparatus for performing communication using wi-fi between devices. The method includes: scanning channels that are available to gather information related to surroundings: transmitting a probe request frame through a social channel for searching devices that are to perform communication; receiving a probe response frame from the second device through a listen channel in response to the probe request frame in a (Continued)

listen state; and performing a group owner negotiation with the second device in order to determine a group owner, wherein the listen channel is included in the social channel, and wherein the probe request frame is transmitted from each social channel, and a predetermined hold time is present for receiving the probe response frame after transmitting the probe request frame in each social channel.

14 Claims, 25 Drawing Sheets

(51) Int. Cl.
    *H04W 84/20*     (2009.01)
    *H04W 92/18*     (2009.01)
    *H04W 84/12*     (2009.01)
    *H04W 48/16*     (2009.01)
    *H04W 76/02*     (2009.01)
    *H04W 84/18*     (2009.01)
    *H04L 5/00*     (2006.01)

(52) U.S. Cl.
    CPC ......... *H04W 76/023* (2013.01); *H04W 84/18* (2013.01); *H04W 48/16* (2013.01); *H04W 84/12* (2013.01); *H04W 84/20* (2013.01); *H04W 92/18* (2013.01)

(56) References Cited

U.S. PATENT DOCUMENTS

| | | | |
|---|---|---|---|
| 2011/0225305 A1* | 9/2011 | Vedantham | G06F 1/3203 709/227 |
| 2012/0134349 A1 | 5/2012 | Jung et al. | |
| 2013/0148545 A1* | 6/2013 | Jung | H04W 48/16 370/255 |
| 2013/0148643 A1 | 6/2013 | Abraham et al. | |
| 2013/0232253 A1* | 9/2013 | Elhaddad | H04W 8/005 709/224 |
| 2015/0105023 A1 | 4/2015 | Jung et al. | |

OTHER PUBLICATIONS

Author Unknown, IBM Technical Disclosure Bulletin, Jun. 1983, vol. 26, Issue 1, pp. 89-90.*
Camps-Mur et al., "Device-to-Device Communications with WiFi Direct: Overview and Experimentation", IEEE Wireless Communications, vol. 20, Issue 3, pp. 96-104, Jun. 2013.
International Search Report dated Sep. 29, 2014, for International application No. PCT/KR2014/005039.

* cited by examiner

[FIG. 1]
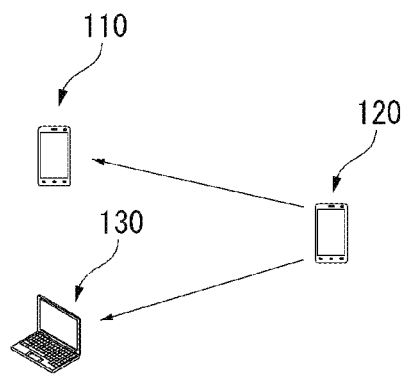
(a) FILE TRANSMISSION
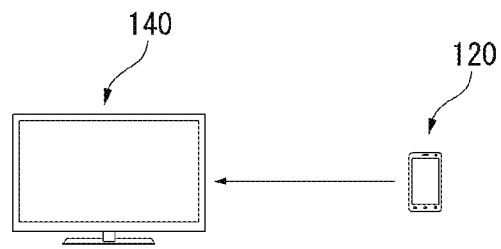
(b) MEDIA PLAY
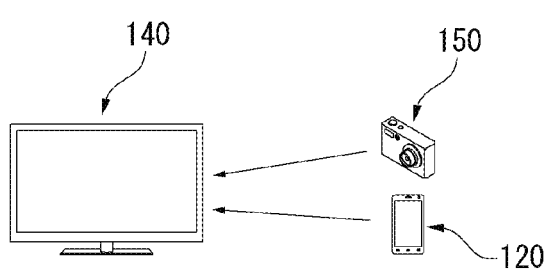
(c) VIDEO OR PICTURE TRANSMISSION
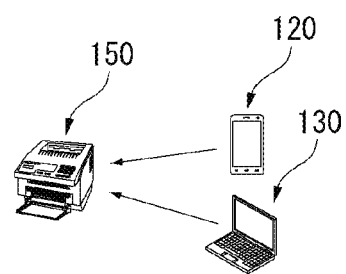
(d) PRINTING

[FIG. 2]
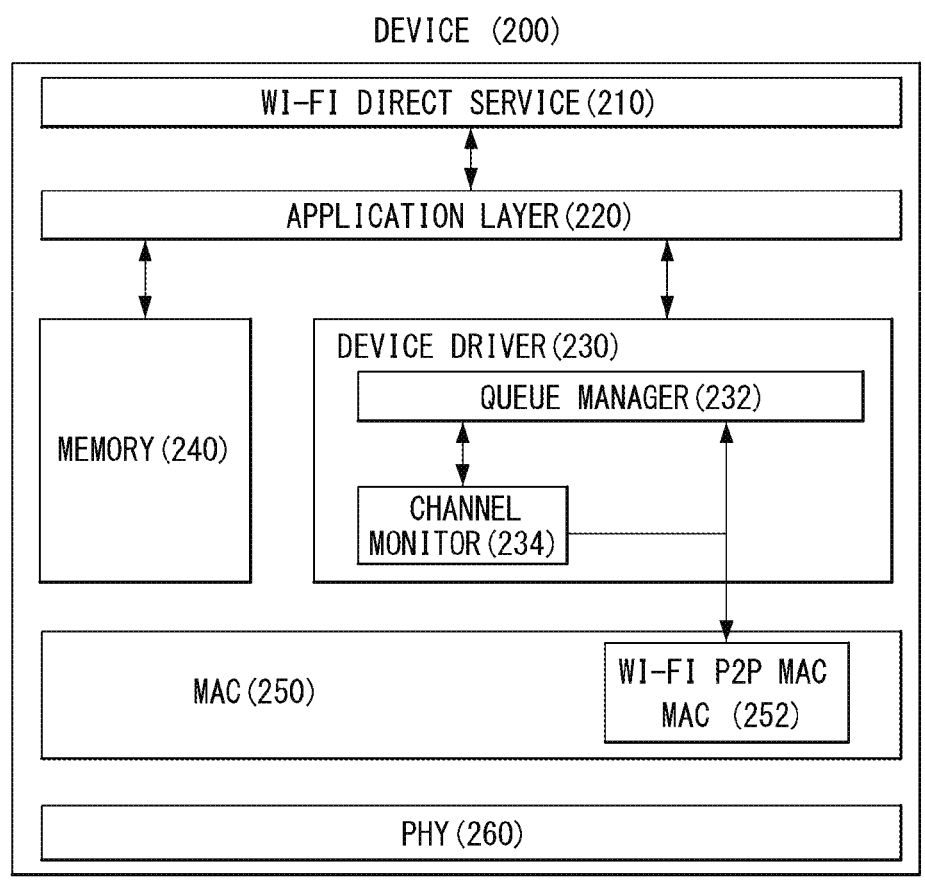

[FIG. 3]
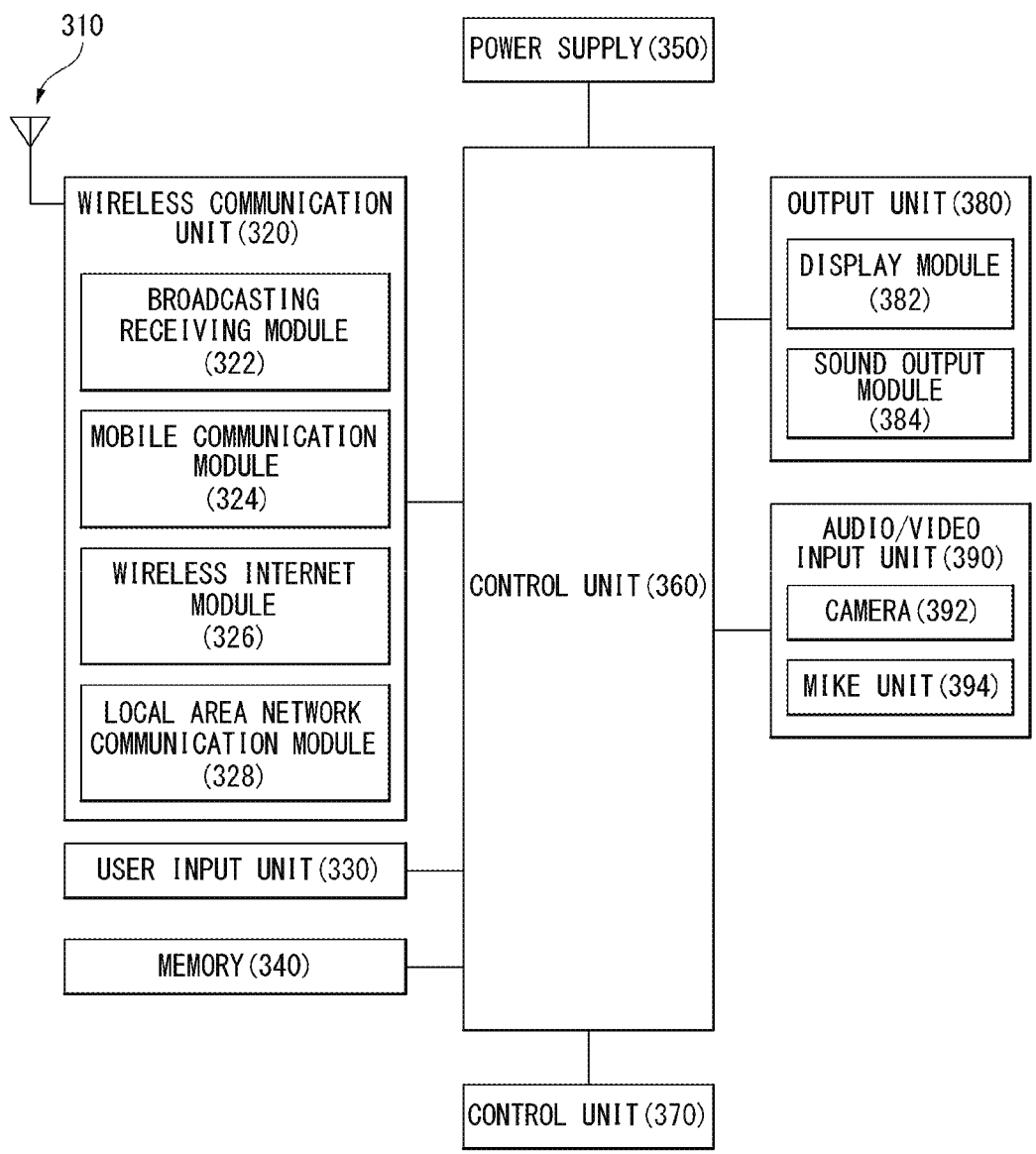

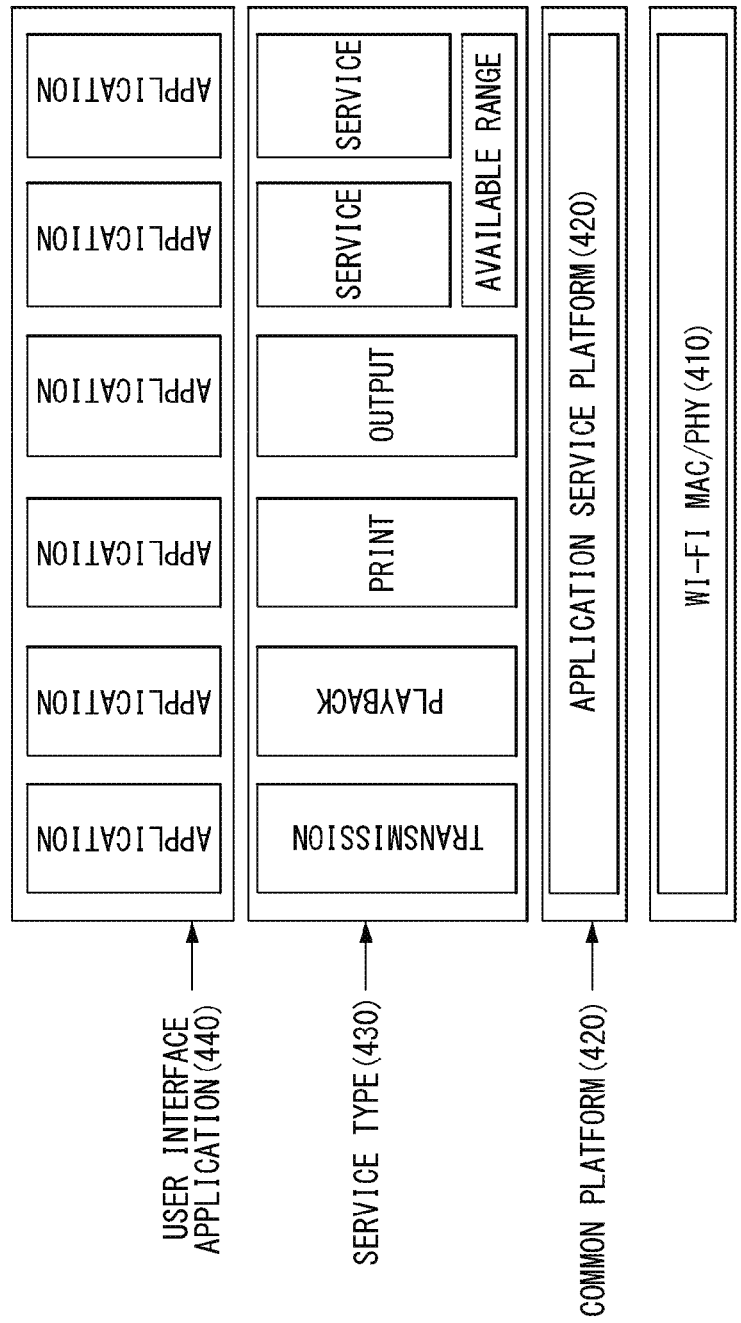

[FIG. 5]
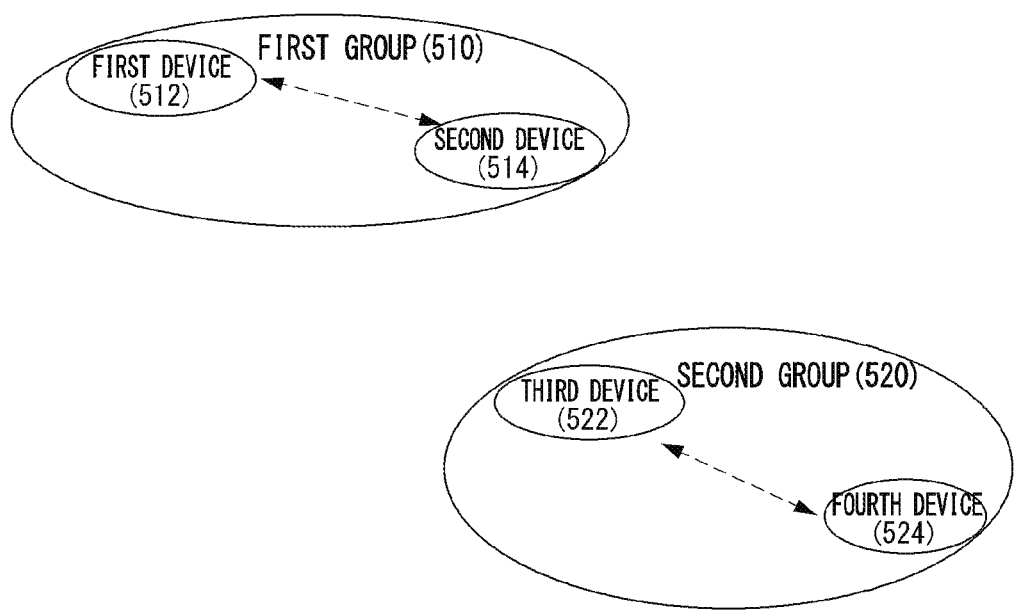

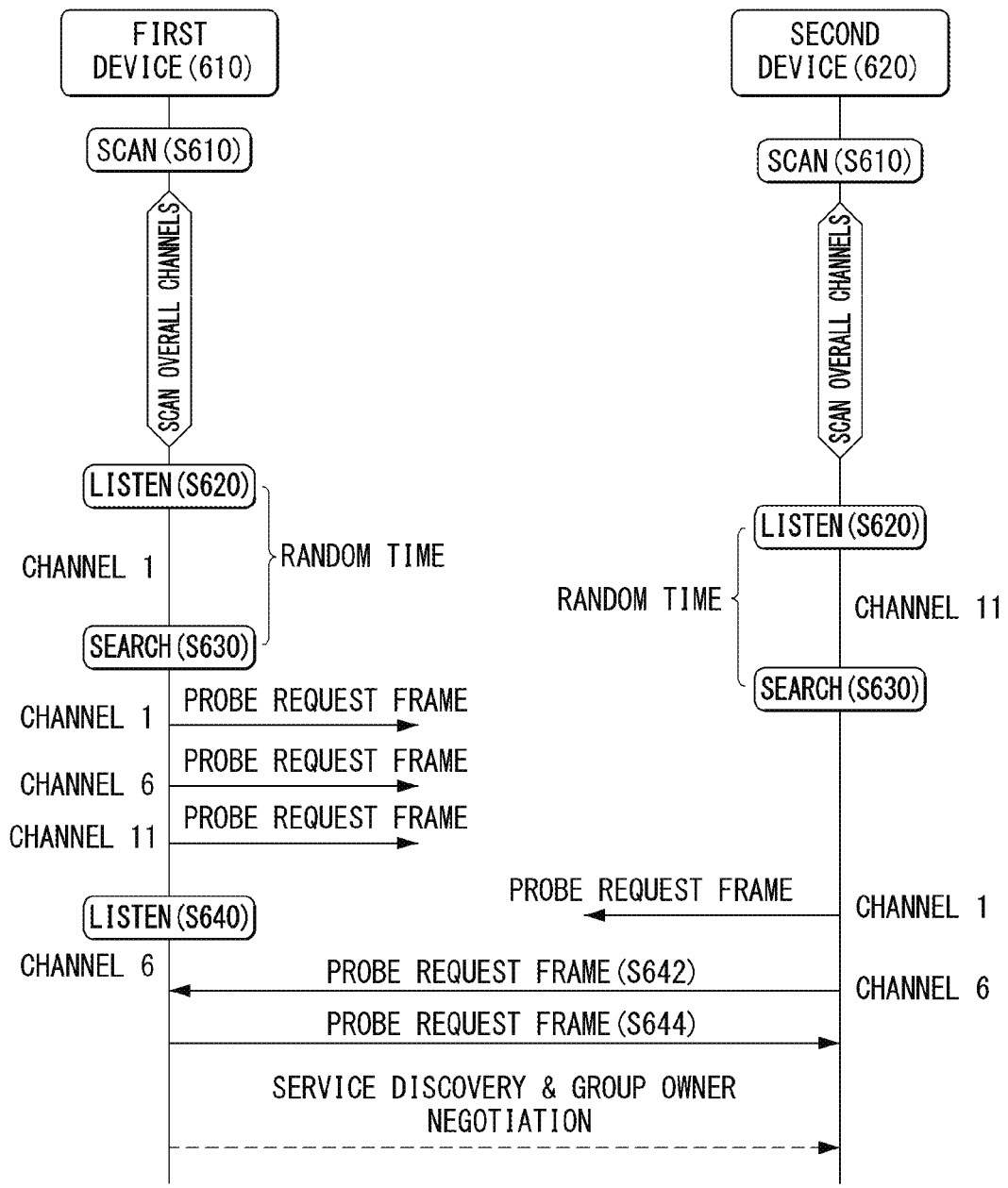
[FIG. 6]

[FIG. 7]
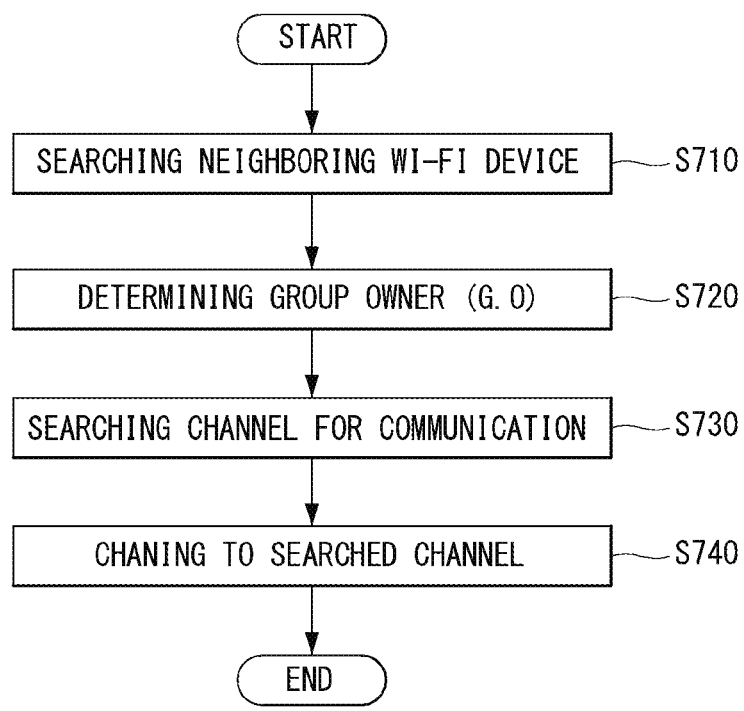

[FIG. 8]
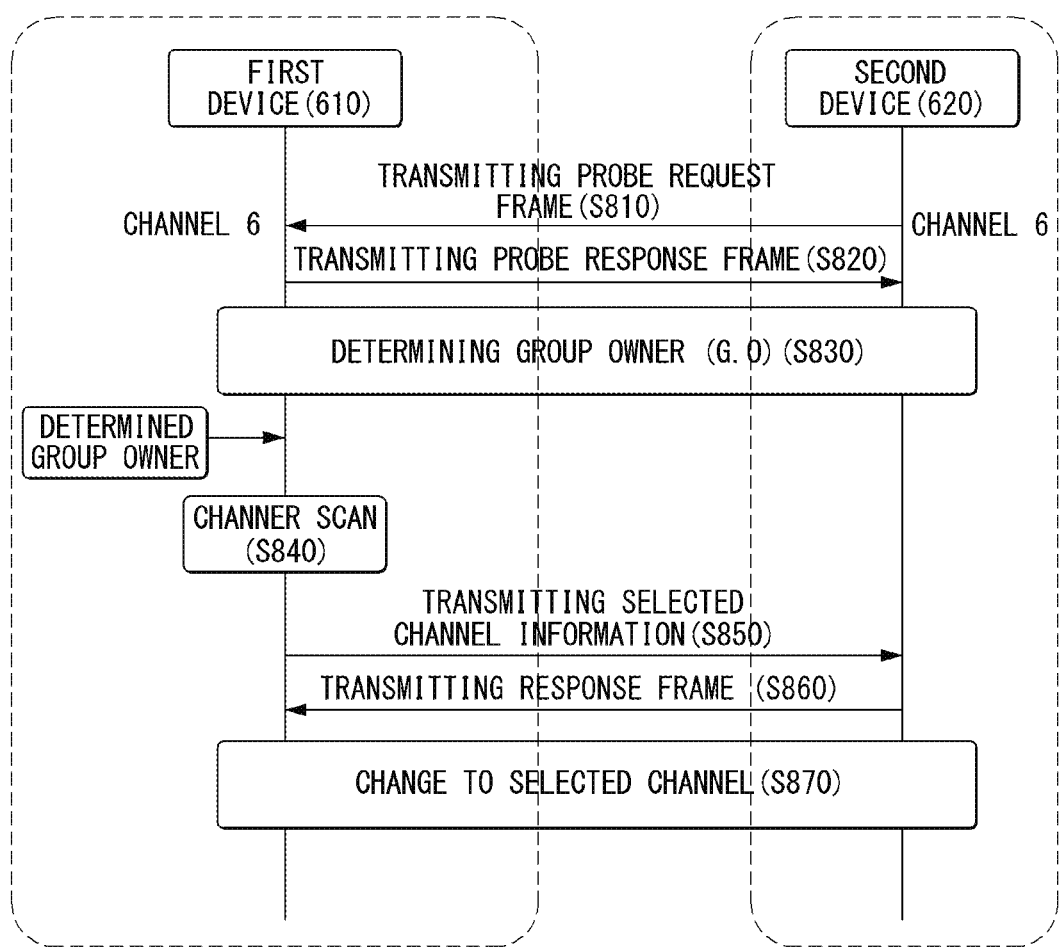

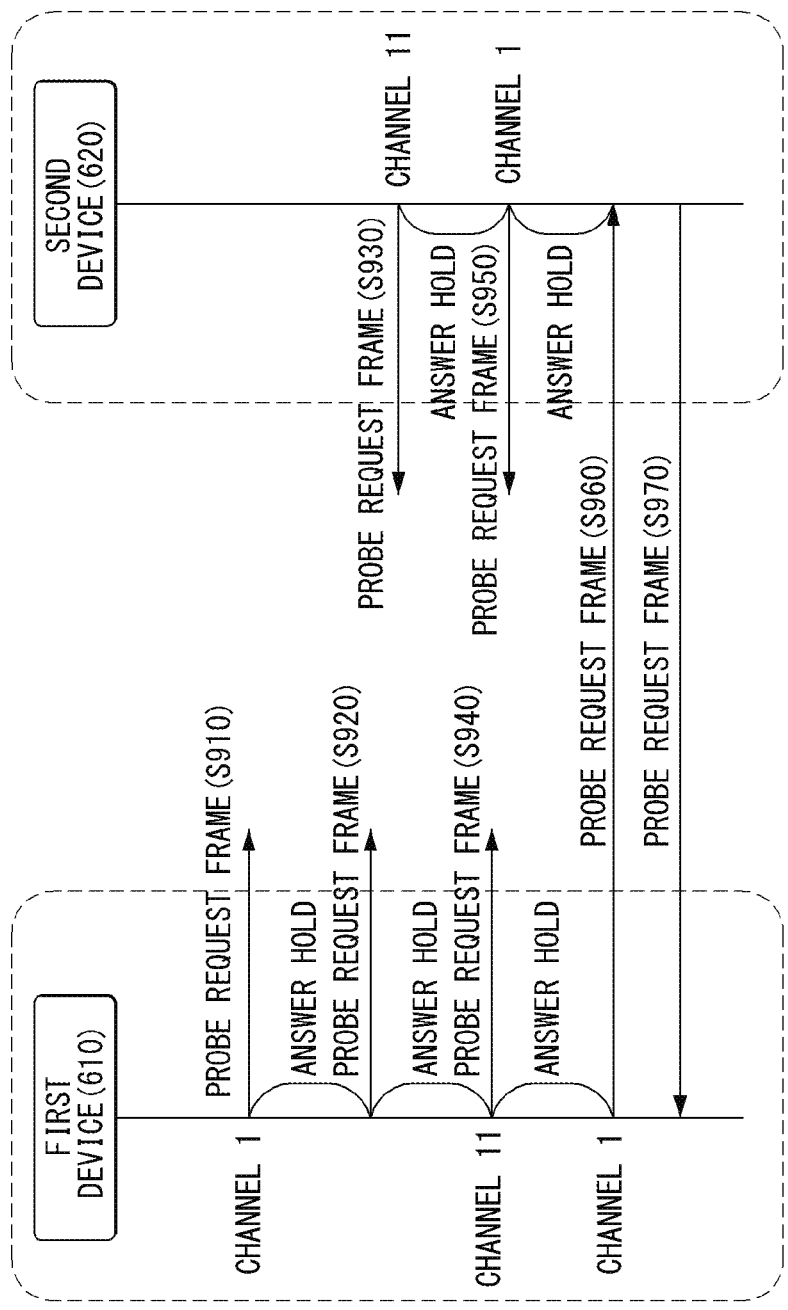
[FIG. 9]

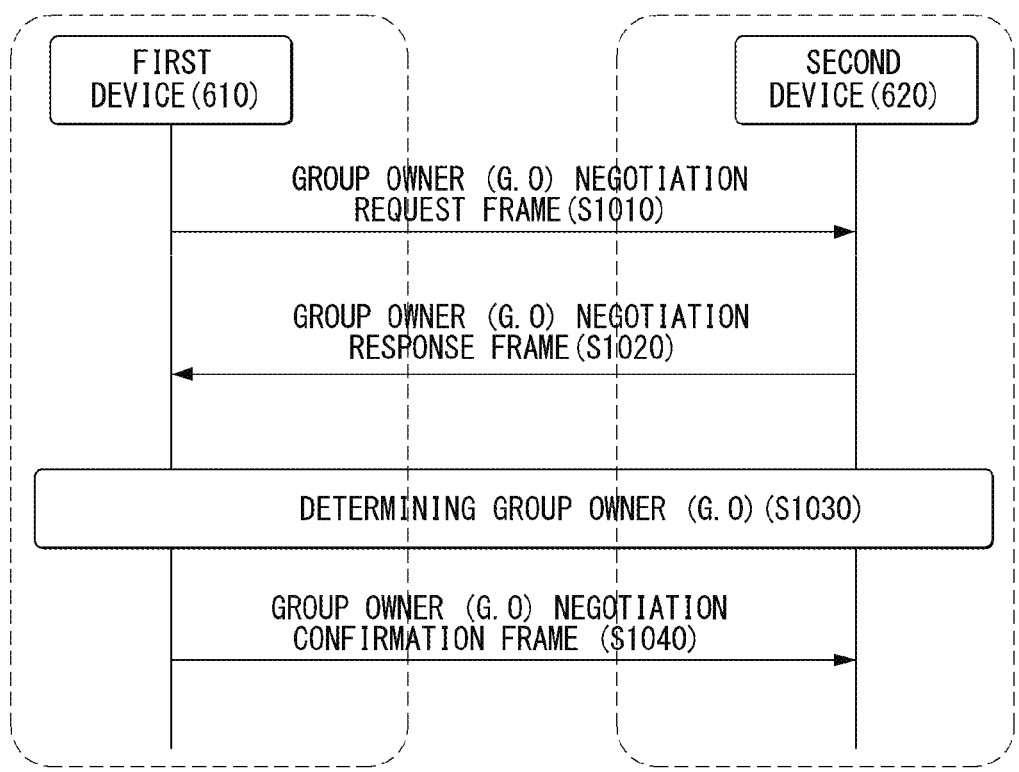
[FIG. 10]

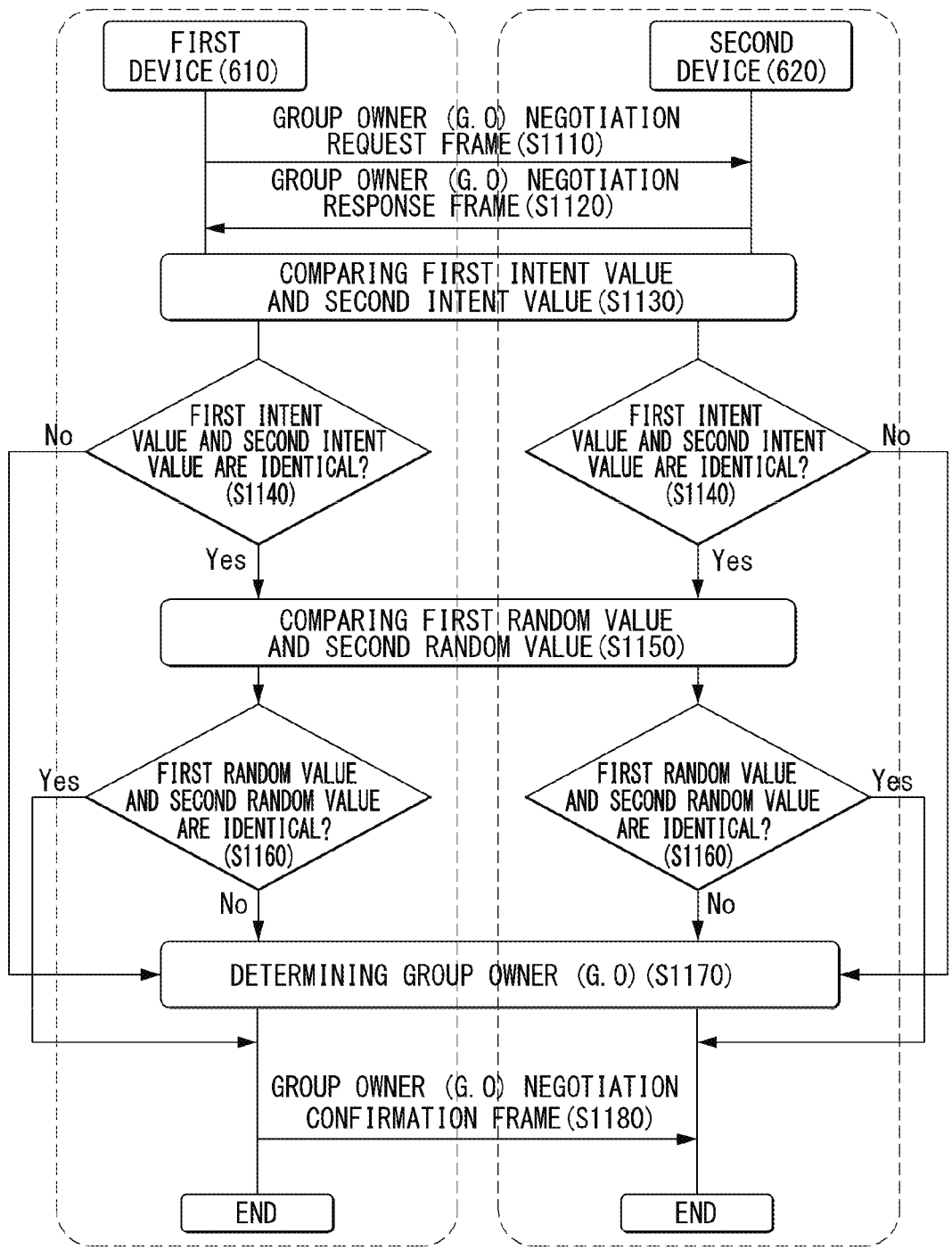
[FIG. 11]

[FIG. 12]
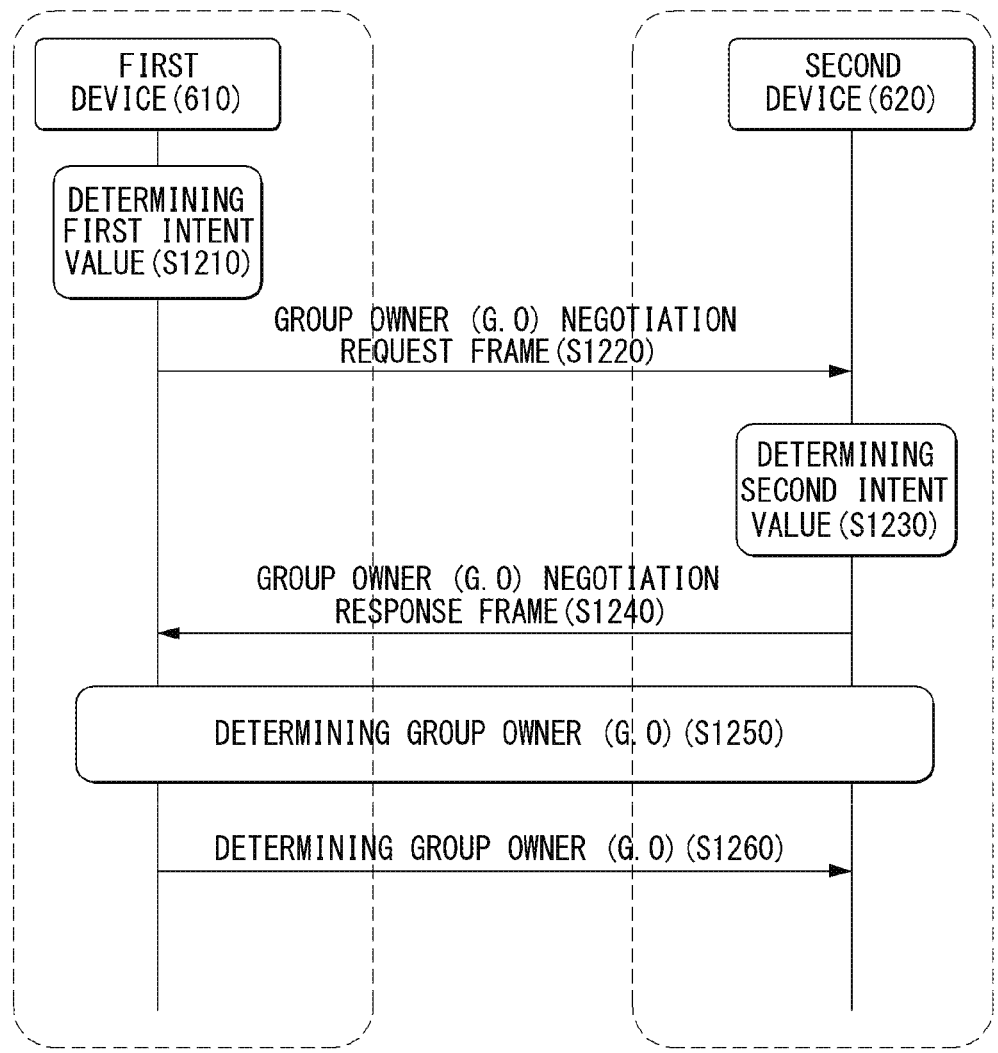

[FIG. 13]
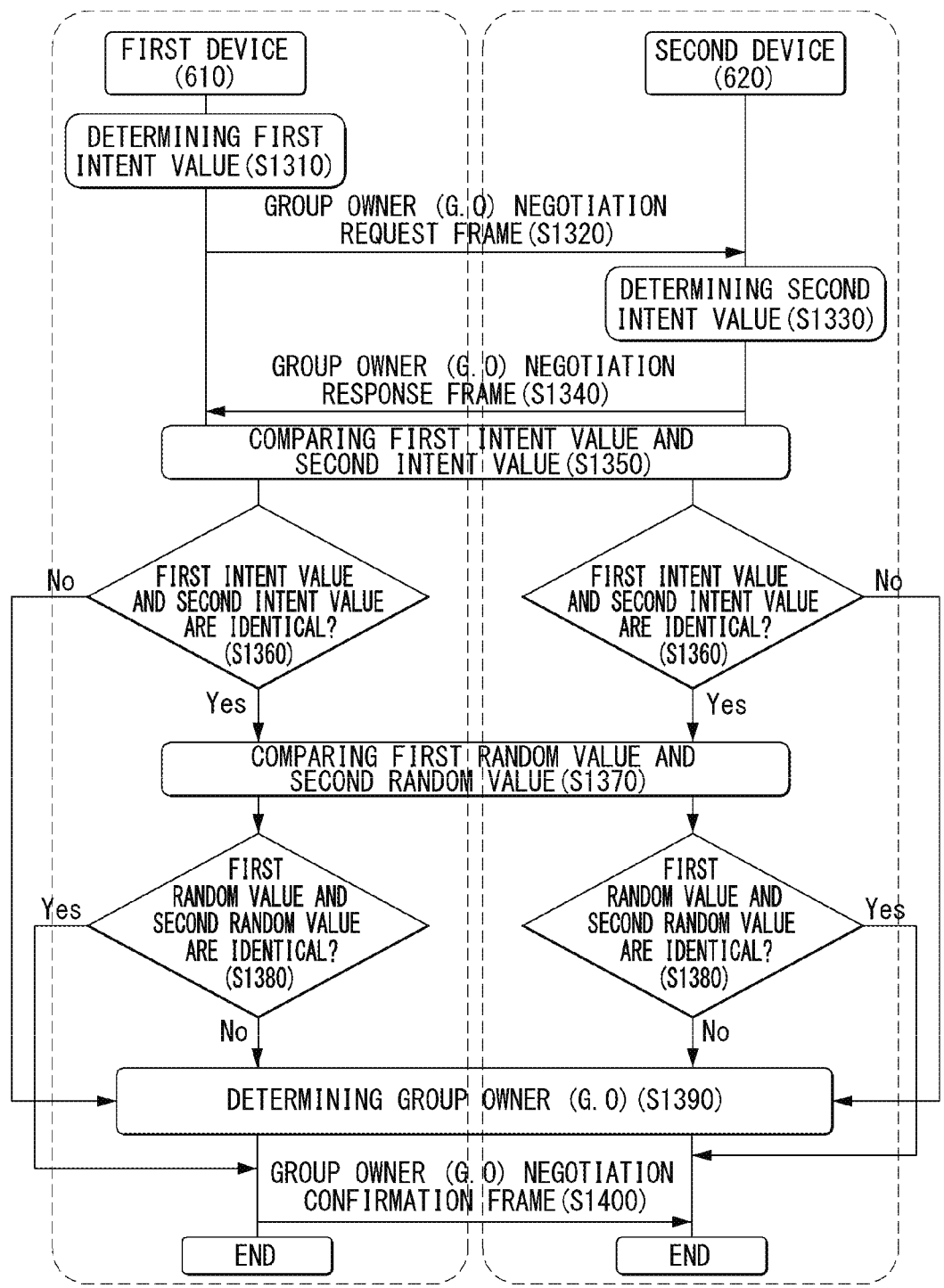

[FIG. 14]
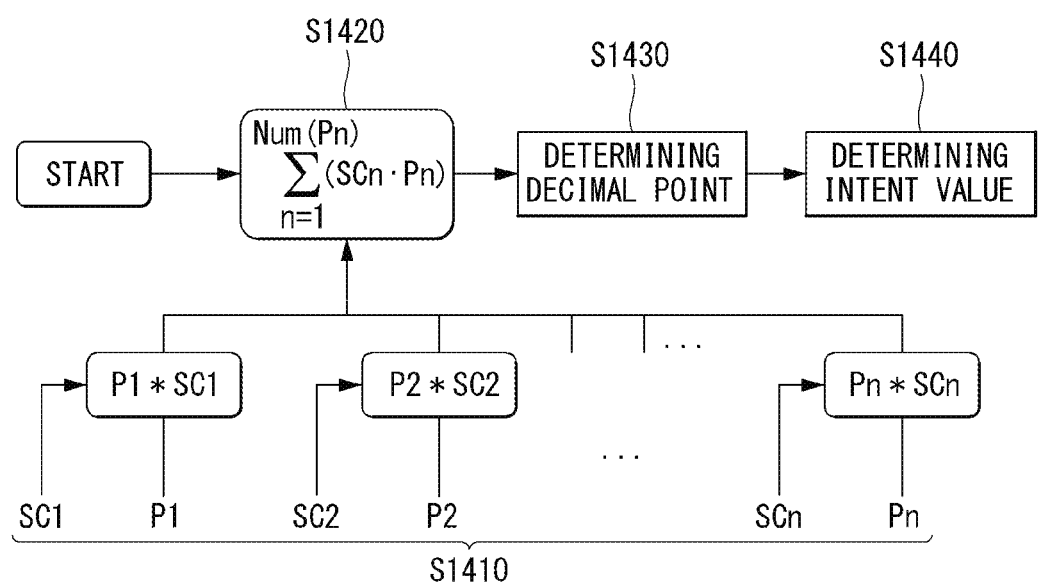

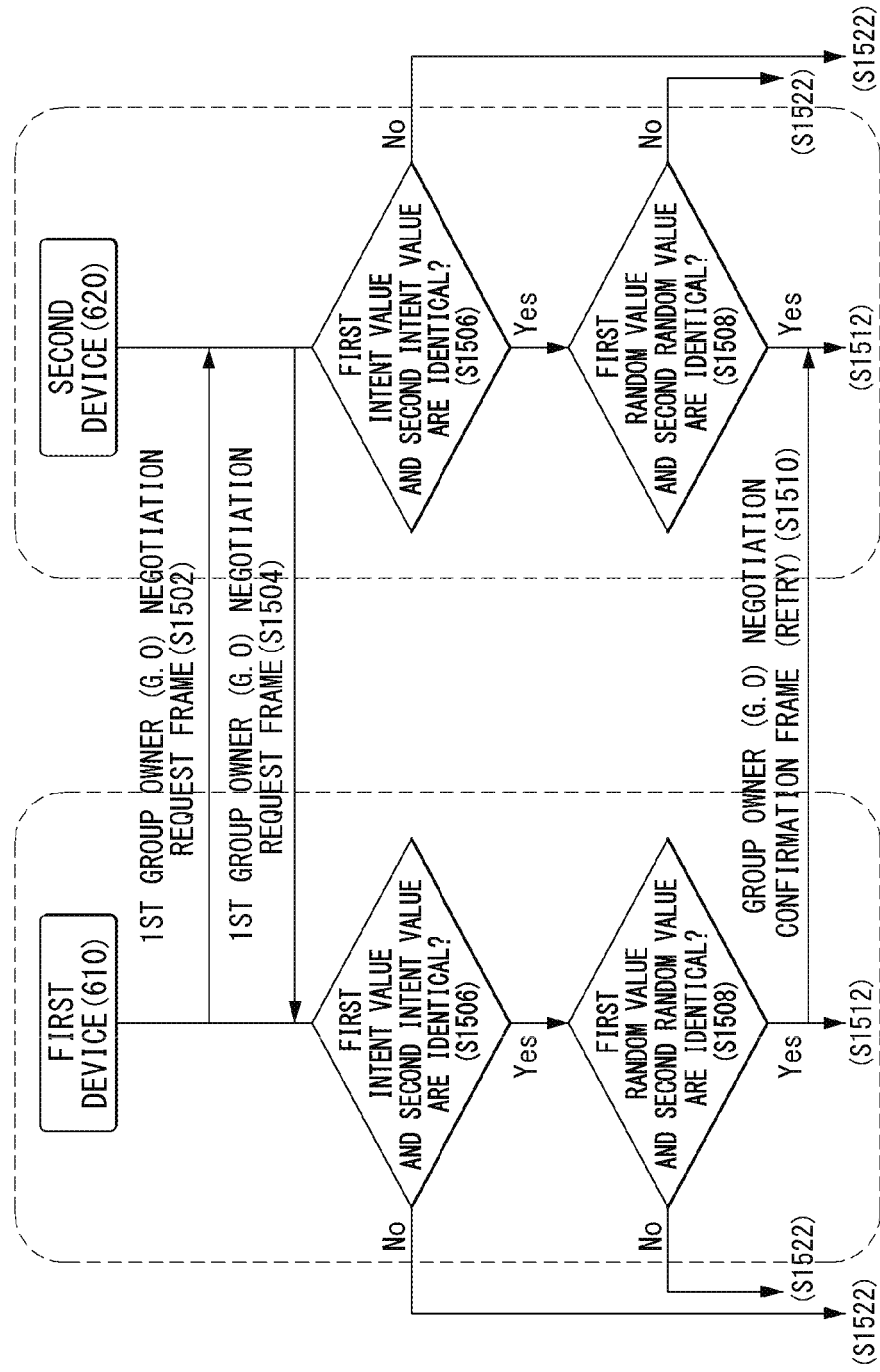

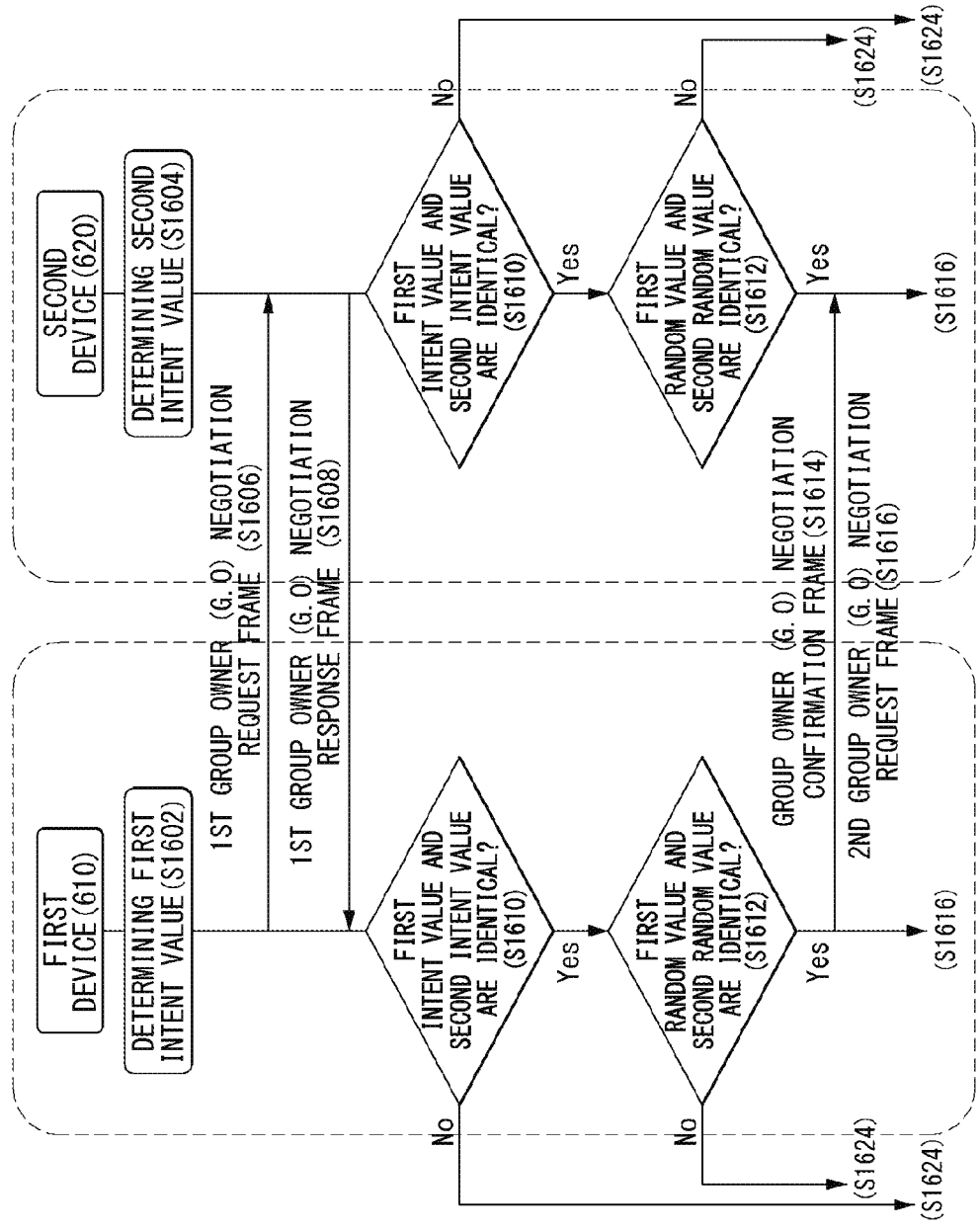

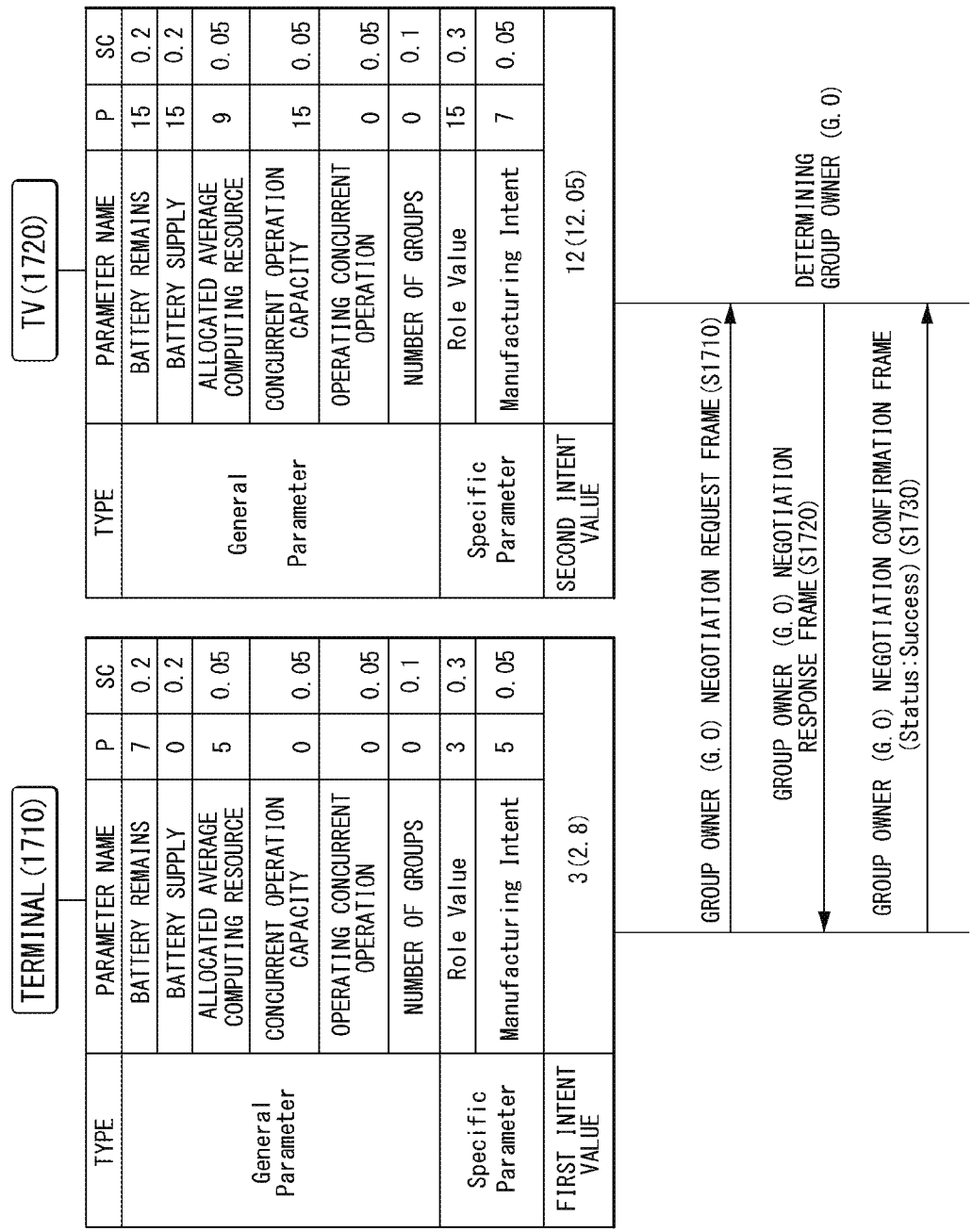

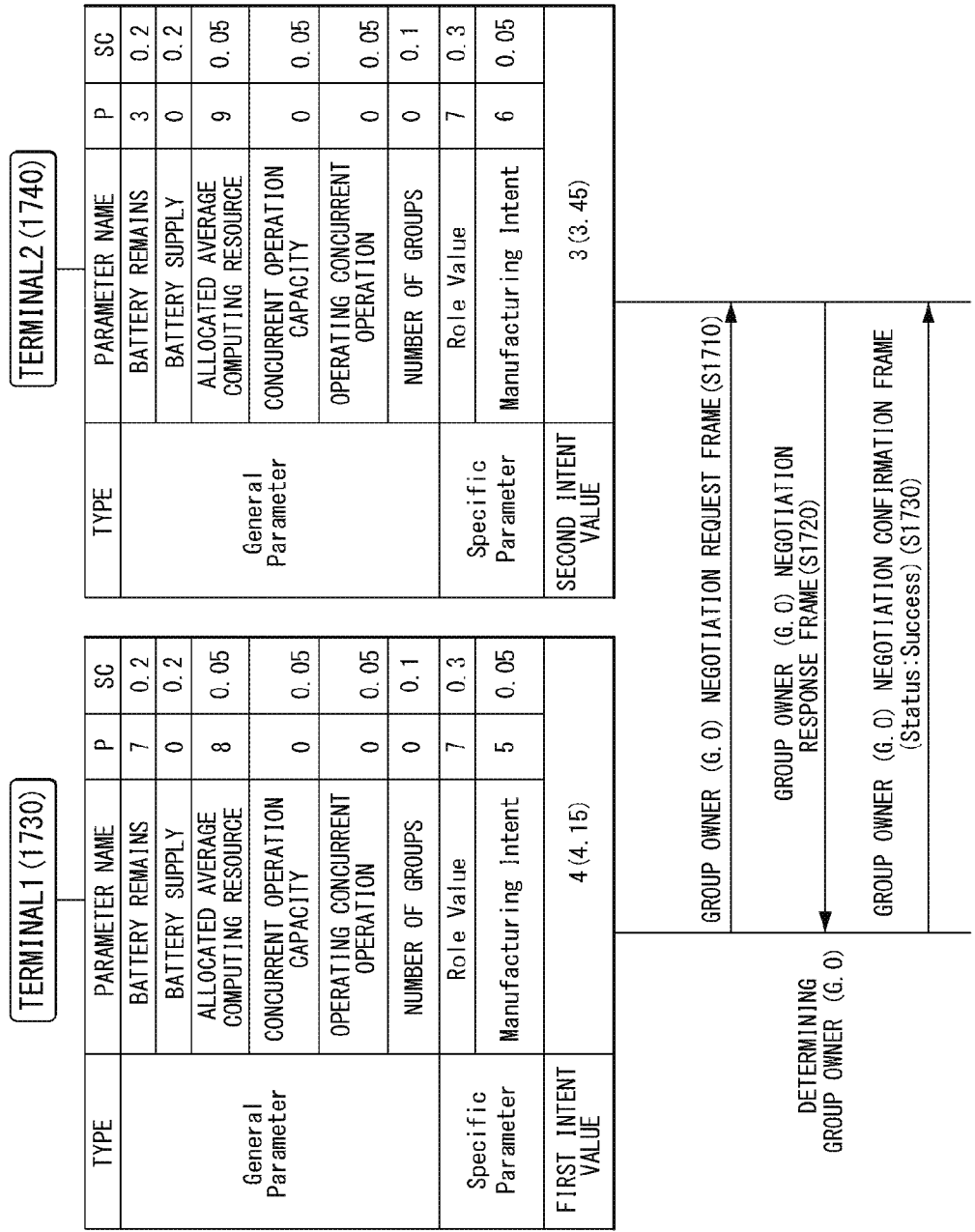

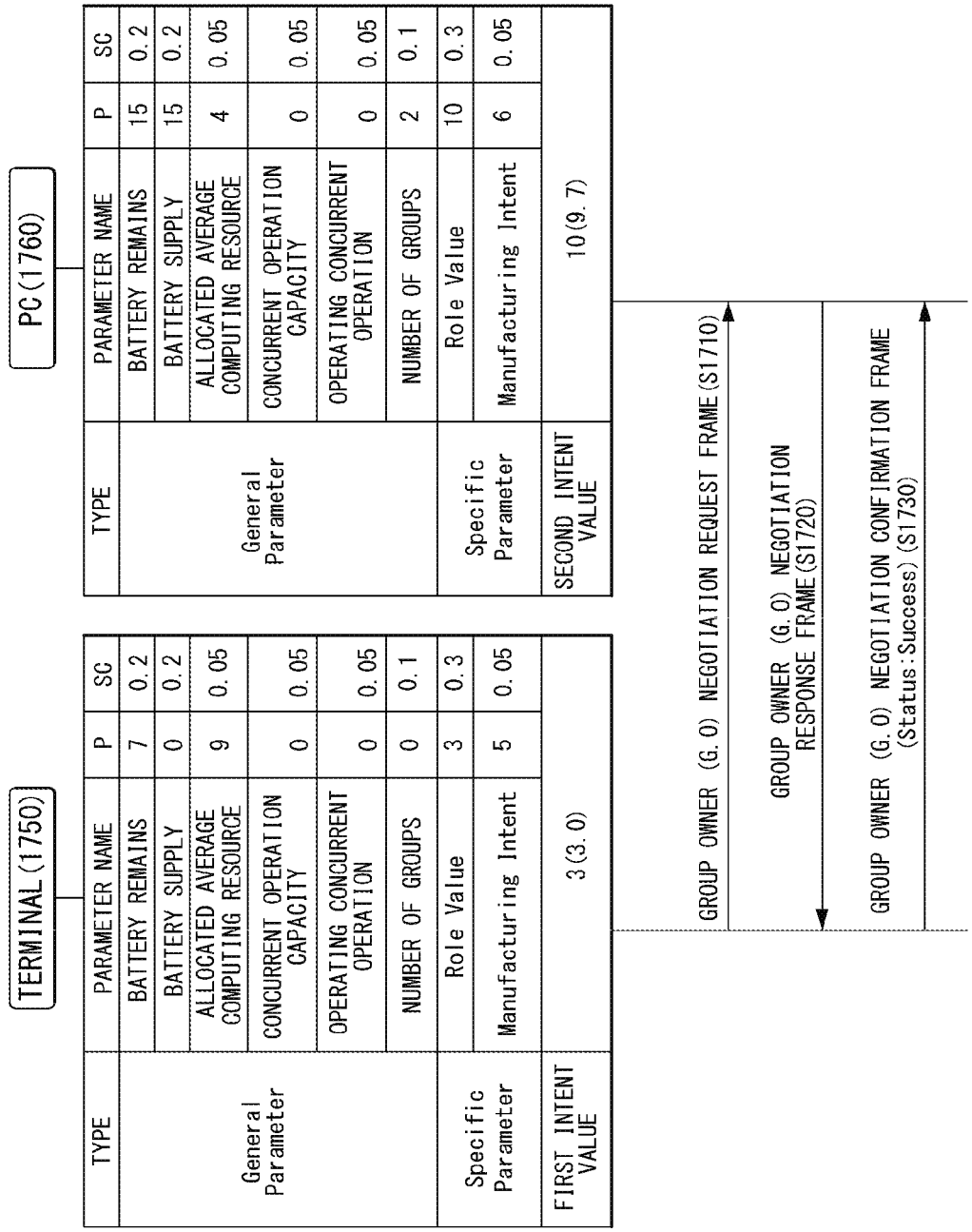

[FIG. 18]
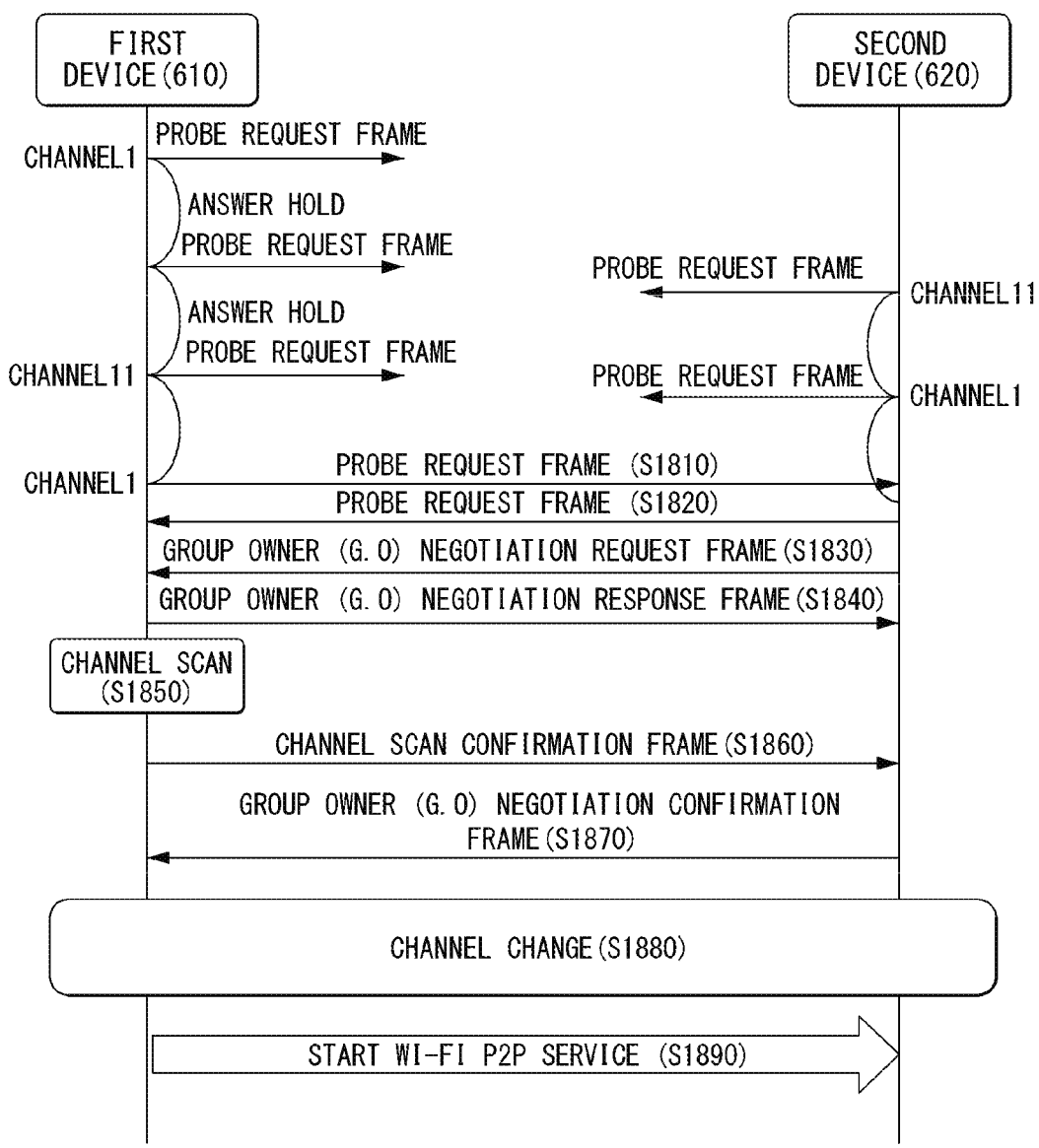

[FIG. 19]
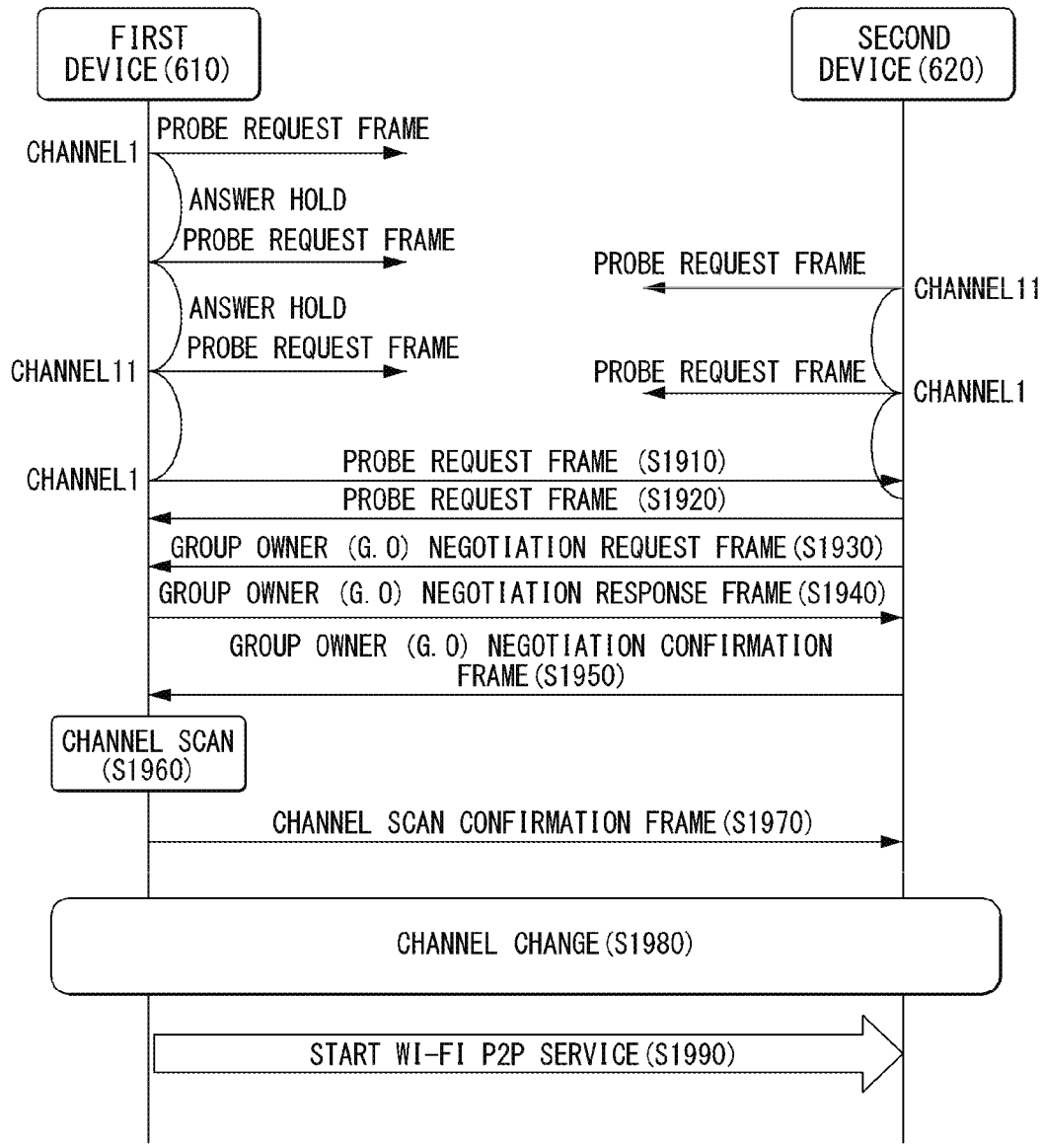

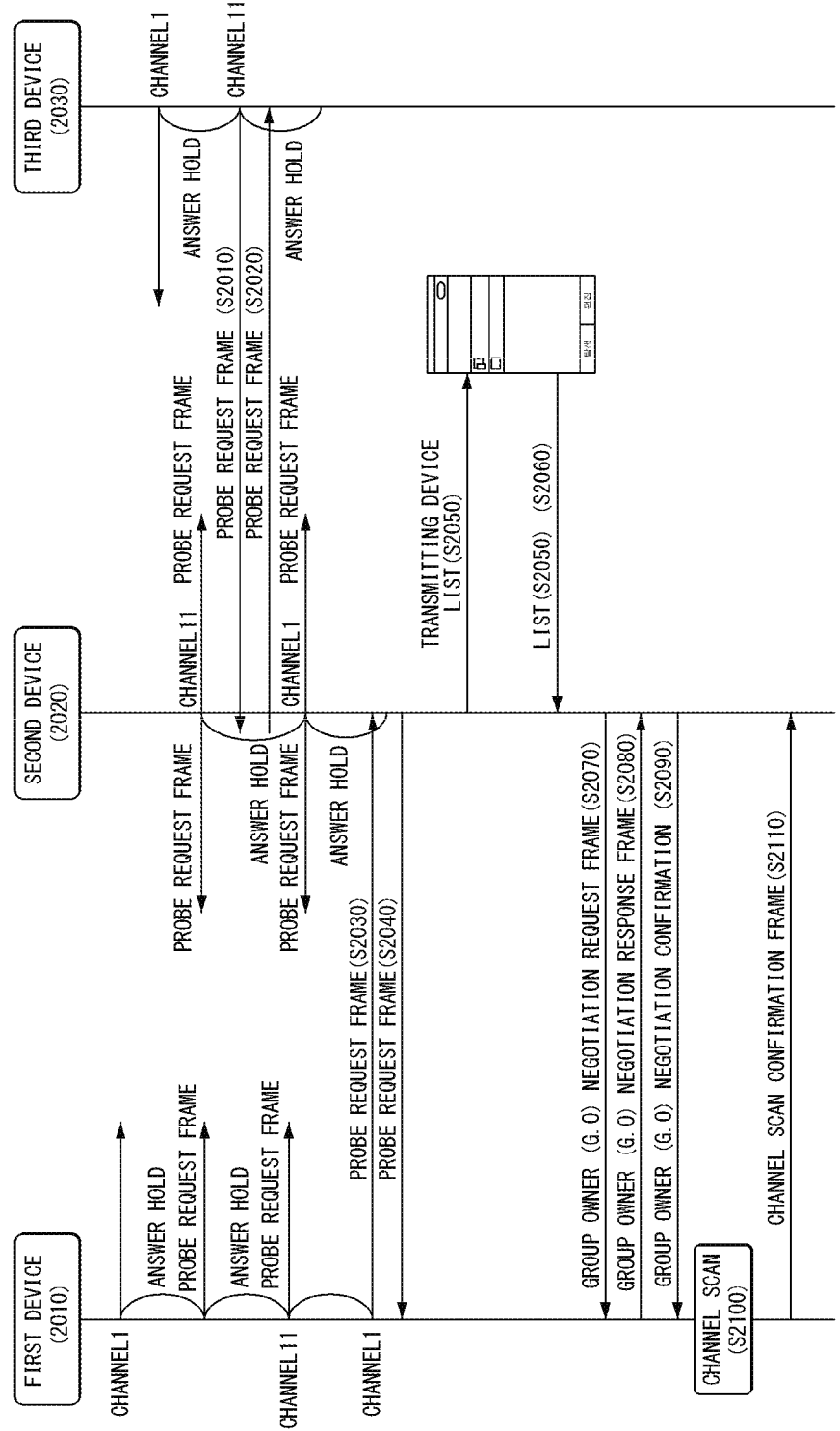

METHOD AND DEVICE FOR COMMUNICATION BETWEEN DEVICES IN WIRELESS COMMUNICATION SYSTEM

TECHNICAL FIELD

The present invention relates to wireless communication systems between devices and, more particularly, to a method and apparatus for a Wi-Fi P2P communication.

BACKGROUND ART

Wireless communication systems have been widely used in order to provide various sorts of communication services such as voice or data. Generally, wireless communication systems are multiple access systems which are available to support communication with multiple users by sharing available system resources (bandwidth, transmission power, etc.).

Wi-Fi P2P technology is mounted on mobile devices and mobile terminals such as TVs, notebooks, printers and cameras, and provides a basis available to use contents and services between devices through direct communication between terminals without separate equipments such as Access Points (APs) or routers. Wi-Fi P2P technology may provide high transmission speed.

The present invention, in Wi-Fi P2P technology mentioned above, proposes a method and apparatus which are available to connect Wi-Fi P2P connection between devices efficiently.

DISCLOSURE

Technical Problem

An object of the present invention is to provide a method and apparatus for performing Wi-Fi P2P connection between devices in wireless communication systems.

Another object of the present invention is to provide a method and apparatus for performing Wi-Fi P2P connection between devices in wireless communication systems efficiently.

Still another object of the present invention is to provide a method and apparatus for performing Wi-Fi P2P connection between devices in wireless communication systems efficiently by decreasing the number of Social Channels that search peripheral devices.

Still another object of the present invention is to provide a method and apparatus for searching peripheral devices by transmitting and hearing a probe request message in every Social Channel in wireless communication systems.

Still another object of the present invention is to provide a method and apparatus for searching Operation Channels only by a Group Owner which is determined between devices in wireless communication systems.

Still another object of the present invention is to provide a method and apparatus for changing an Operation Channel searched by the Group Owner to a channel in wireless communication systems.

Still another object of the present invention is to provide a method and apparatus for determining a Group Owner between devices.

Still another object of the present invention is to provide a method and apparatus for determining an Intent value in the method for determining a Group Owner between devices.

Still another object of the present invention is to provide a method and apparatus for dynamically determining an Intent value by considering states or surroundings of a terminal.

Still another object of the present invention is to provide a method and apparatus for dynamically determining an Intent value in case that the Intent value determined when the device is manufactured and a random value are identical in determining a Group Owner between devices.

The technical objects which are to be achieved in the present invention will not limited only to the technical objects described above. Accordingly, technical objects that have not been mentioned above or additional technical objects of the present invention may become apparent to those having ordinary skill in the art from the description will be presented below.

Technical Solution

In an aspect, a method for achieving the objects includes scanning channels that are available to gather information related to surroundings: transmitting a Probe Request Frame through a Social Channel for searching devices that are to perform communication; receiving a Probe Response Frame from the second device through a Listen Channel in response to the Probe Request Frame in a Listen State; and performing a Group Owner Negotiation with the second device in order to determine a Group Owner, wherein the Listen Channel is included in the Social Channel, and wherein the Probe Request Frame is transmitted from each Social Channel, and a predetermined hold time is present for receiving the Probe Response Frame after transmitting the Probe Request Frame in each Social Channel.

In addition, in the present invention, the predetermined hold time is differently determined for each Social Channel.

In addition, in the present invention, the Social Channel has two channels.

In addition, the present invention provides a method including: transmitting a Probe Request Frame through a Social Channel for searching devices that are to perform communication; receiving a Probe Response Frame from the second device through a Listen Channel in response to the Probe Request Frame in a Listen State; determining a Group Owner through a Group Owner Negotiation with the second device; and performing channel scan for searching an optimal Operating Channel that is to perform communication based on a result of the Group Owner determination, wherein the performing channel scan includes performed by only a Group Owner determined according to the result of the Group Owner determination.

In addition, in the present invention, in case that the Group Owner is the first device, wherein performing the channel scan further includes: transmitting channel information related to an optimal Operating Channel that is to perform communication as a result of the channel scan; and changing channel to the optimal Operating Channel that is to perform communication.

In addition, in the present invention, the Group Owner Negotiation includes: transmitting a Group Owner Negotiation Request Frame that includes a first Group Owner Negotiation information to the second device; receiving a Group Owner Negotiation Response Frame that includes a second Group Owner Negotiation information in response to the Group Owner Negotiation Request Frame from the second device; and determining a Group Owner using the first Group Owner Negotiation information and the second Group Owner Negotiation information, wherein the first Group Owner Negotiation information includes a first Intent value and a first random value, and the second Group Owner Negotiation information includes a second Intent value and a second random value.

In addition, in the present invention, determining the Group Owner is determined such that a device having greater value between the first Intent value and the second Intent value is determined to be the Group Owner In addition, in the present invention, determining the Group Owner further includes comparing the first random value and the second random value in case that the first Intent value and the second Intent value are identical, wherein a device having greater value between the first random value and the second random value is determined to be the Group Owner.

In addition, the present invention provides a method including: transmitting a Group Owner Negotiation Request Frame that includes a first Group Owner Negotiation information for Group Owner Negotiation to the second device; receiving a Group Owner Negotiation Response Frame that includes a second Group Owner Negotiation information in response to the Group Owner Negotiation Request Frame from the second device; and negotiating a Group Owner based on the first Group Owner Negotiation information and the second Group Owner Negotiation information, wherein the first Group Owner Negotiation information includes a first Intent value and a first random value, and the second Group Owner Negotiation information includes a second Intent value and a second random value, and wherein the first Intent value and the second Intent value are determined by at least one of state of each device and surroundings.

In addition, in the present invention, negotiating the Group Owner, in case that the first Intent value is greater than the second Intent value, the first device is negotiated to the Group Owner.

In addition, in the present invention, negotiating the Group Owner further includes comparing the first random value and the second random value in case that the first Intent value and the second Intent value are identical, wherein the first device is negotiated to the Group Owner in case that the first Intent value is greater than the second Intent value.

In addition, in the present invention, the method further includes transmitting a Group Owner Negotiation Confirmation message to the second device.

In addition, in the present invention, the first Intent value and the second Intent value are determined by specific parameter values multiplied by a scale factor.

In addition, in the present invention, the specific parameter values are values that digitize an influence to at least one of states and surroundings of each of the first device and the second device.

In addition, the present invention provides an apparatus including: a transmitting unit for transmitting a Probe Request Frame through a Social Channel; a receiving unit for receiving a Probe Response Frame from the second device in response to the Probe Request Frame in a Listen State; and a control unit for scanning channels which are available to support in order to gather information related to surroundings, controlling the first device in a Listen State, and performing a Group Owner Negotiation with the second device in order to determine a Group Owner, wherein the Listen Channel is included in the Social Channel, and wherein the Probe Request Frame is transmitted from each Social Channel, and a predetermined hold time is present for receiving the Probe Response Frame after transmitting the Probe Request Frame in each Social Channel.

In addition, in the present invention, the predetermined hold time is differently determined for each Social Channel.

In addition, in the present invention, the Social Channel has two channels.

In addition, the present invention provides an apparatus including: a transmitting unit for transmitting a Group Owner Negotiation Request Frame that includes a first Group Owner Negotiation information for Group Owner Negotiation to the second device; a receiving unit for receiving a Group Owner Negotiation Response Frame that includes a second Group Owner Negotiation information in response to the Group Owner Negotiation Request Frame from the second device; and a control unit for negotiating a Group Owner based on the first Group Owner Negotiation information and the second Group Owner Negotiation information, wherein the first Group Owner Negotiation information includes a first Intent value and a first random value, and the second Group Owner Negotiation information includes a second Intent value and a second random value, and wherein the first Intent value and the second Intent value are determined by at least one of state of each device and surroundings.

In addition, in the present invention, the first Intent value and the second Intent value are determined by specific parameter values multiplied by a scale factor.

Technical Effects

The method and apparatus for communication in wireless communication systems according to the present invention has the following technical effects.

According to the present invention, it is available to perform P2P connection between Wi-Fi devices.

According to the present invention, it is available to shorten a time for P2P connection between Wi-Fi devices.

According to the present invention, it is available to shorten a time for P2P connection by decreasing a number of Social Channels in performing P2P connection between Wi-Fi devices.

According to the present invention, it is available to determine more proper Group Owner by determining a Group Owner by considering surroundings between Wi-Fi devices or states of devices.

According to the present invention, the Group Owner only which is determined between Wi-Fi devices is allowed to determine the Operation Channel by searching so that it may avoid the devices which are not Group Owner from performing unnecessary channel search.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates an example of pear to pear (P2P) connection between devices proposed by the present invention.

FIG. 2 illustrates an example of inner block diagram of a Wi-Fi device 200 proposed by the present invention.

FIG. 3 illustrates another example of inner block diagram of a Wi-Fi device proposed by the present invention.

FIG. 4 is a diagram schematically illustrating a functional aspect of internal configuration of a Wi-Fi device proposed by the present invention.

FIG. 5 illustrates an example of group formation of devices in a Wi-Fi P2P system proposed by the present invention.

FIG. 6 illustrates a device discovery procedure of P2P devices in a Wi-Fi direct system.

FIG. 7 is a flowchart illustrating an example of a Wi-Fi P2P connection procedure proposed by the present invention.

FIG. 8 is a flowchart illustrating an example of a method for scan channels in a Wi-Fi P2P connection procedure proposed by the present invention.

FIG. 9 is a flowchart illustrating an example of a method for searching neighboring devices in a Wi-Fi P2P connection procedure proposed by the present invention.

FIG. 10 is a diagram illustrating a Group Owner Negotiation procedure of a group of P2P devices in a Wi-Fi Direct system.

FIG. 11 is a flowchart illustrating an example of a Group Owner Negotiation procedure proposed by the present invention.

FIG. 12 is a flowchart illustrating another example of a Group Owner Negotiation procedure proposed by the present invention.

FIG. 13 is a flowchart illustrating yet another example of a Group Owner Negotiation procedure proposed by the present invention.

FIG. 14 is a diagram illustrating a method for dynamically determining an Intent value proposed by the present invention.

FIG. 15a and FIG. 15b are flowcharts illustrating still another example of a Group Owner Negotiation procedure proposed by the present invention.

FIG. 16a and FIG. 16b are flowcharts illustrating still another example of a Group Owner Negotiation procedure proposed by the present invention.

FIG. 17a to FIG. 17d are diagrams illustrating particular embodiments of a Group Owner Negotiation procedure proposed by the present invention.

FIG. 18 is a flowchart illustrating an overall procedures for a Wi-Fi P2P connection to which the present invention is applied.

FIG. 19 is another flowchart illustrating an overall procedures for a Wi-Fi P2P connection to which the present invention is applied.

FIG. 20 is a flowchart illustrating a procedure in which a third device is searched during Wi-Fi P2P connection which is applied to the present invention.

MODE FOR INVENTION

Figure 15B:
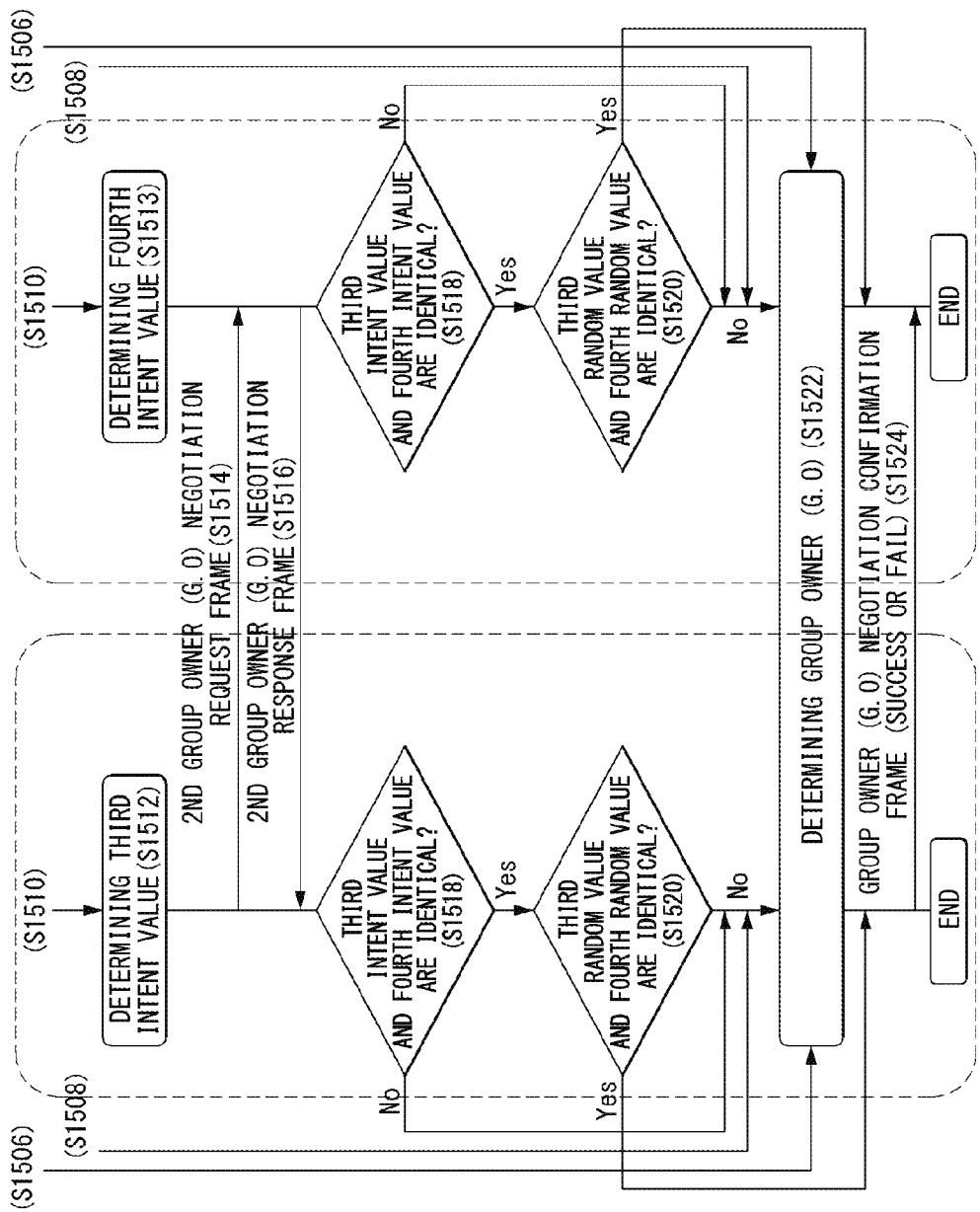

The objects, characteristics and merits of the present invention mentioned above will be clear through the following detailed description in relation to the accompanying drawings. Particular embodiments will be exemplified by the drawings and will be described in detail. However, the present invention may be variously modified and have several embodiments. In general, the same reference numerals represent the same elements throughout the specification. In addition, if it is determined that detailed description for known functions or elements in relation to the present invention unnecessarily obscures the concept of the present invention, then, the detailed description will be omitted.

The method and apparatus in relation to the present invention now will be described in more detail hereinafter by reference to the accompanying drawings. The suffixes "module" and "unit" for the elements used in the following description are added or mixed considering only for convenience of writing specification, but do not have meanings or functions distinguished with each other in itself.

The electronic devices described in the present specification may include mobile phones, smart phones, laptop computers, terminals for digital broadcasting, personal digital assistants (PDSs), portable multimedia players (PMPs), navigation, etc. However, it is apparent to those skilled in the art that the construction according to the embodiments described in the present specification may be applied to fixed terminals such as digital TVs, desktop computers, etc. except for the case that the construction according to the embodiments is applicable only to mobile terminals.

FIG. 1 illustrates an example of pear to pear (P2P) connection between devices proposed by the present invention.

The pear to pear (P2P) connection may also be represented by Wi-Fi P2P connection.

Referring to FIG. 1, an example of Wi-Fi P2P connection between peripheral devices is shown.

In detail, the Wi-Fi P2P technology is mounted on mobile devices and mobile terminals such as TVs, notebooks, printers and cameras, and it is available to provide a basis available to use contents and services between devices through direct communication between terminals without separate equipments such as Access Points (APs) or routers. That is, Wi-Fi P2P devices within a Wi-Fi P2P network may be directly connected with each other. Such a Wi-Fi P2P technology may provide high transmission speed.

The Wi-Fi P2P communication represents a state that the transmission path of signals between two Wi-Fi P2P devices is directly connected between the corresponding Wi-Fi P2P devices without going through via a third party device (e.g., APs or routers) or the existing network.

Such a Wi-Fi P2P technology may be used for (a) file transmission between devices, for example, when a mobile device 120 transmits/receives files to/from another mobile device 110 or notebook computer 130, (b) playing media files stored in the mobile device 120 through a TV 140, (c) transmitting pictures or video files stored in the mobile device 120 or the camera 150 to the TV 140.

In addition, the Wi-Fi P2P technology may also be used for (d) printing out files stored in the mobile device 120 or the notebook computer 130 through the printer 150.

The present invention proposes a method for performing such a P2P connection between Wi-Fi devices efficiently.

FIG. 2 illustrates an example of inner block diagram of a Wi-Fi device 200 proposed by the present invention.

Referring to FIG. 2, the device may include a Wi-Fi direct service 210, an application layer 220, a memory 240, a device driver 230, a MAC layer 250 and a PHY layer 260.

The device driver 230 may include a Queue manager 232 and a channel monitor 234, and the MAC layer 250 may include a Wi-Fi P2P MAC layer 252.

In more detail, the Queue manager 232 may manage a Queue for downloading or streaming contents. For example, the Queue manager 232 may include a Stream Queue Manager and a Download Manager.

The Queue manager 232 may transmit a Queue request to a media device (IMD) or other client device, and receive the response to the request from the media device (IMD) or other client device. In addition, Queue manager 232 may receive a Queue request to a media device (IMD) or other client device, download contents according to the Queue request, and transmit the response to the request.

For example, the Queue manager 232 may transmit a Queue request to a content server (CS) or a local server, for example, a Digital Media Server (DMS) to request downloading specific contents, and receive the response to the request, through the media device (IMD).

In addition, the Queue manager 232 may receive a Queue request to request transmitting content downloaded from a content server (CS) or a local server to a client device (CD), through the media device (IMD).

The Wi-Fi direct service 210 may provide Wi-Fi P2P services between devices. The application layer 220 is a layer that provides an access to network resources to a user and means a layer implemented for communication protocol and scheme which is designed for communication access between processes.

The PHY layer 260 may perform data transmission through wireless channel between a terminal and a base station, coding, physical layer Hybrid Automatic Repeat reQuest (HARQ) processing, modulation, multi-antenna processing, mapping signals to appropriate physical time-frequency resources, mapping a transmission channel to a physical layer, etc. Such a PHY layer 260 may be connected via the MAC layer 250 and a Transport Channel.

In addition, the PHY layer 260, when receiving signals from transceiver, performs the role of demodulation of received signals, equalization, Forward Error Correction (FEC) decoding and transmitting data to the MAC layer 250 through a process such as boosting signals added from the PHY layer.

In order to implement such functions, PHY protocol may include a modulator, a demodulator, an equalizer, a Forward Error Correction (FEC) encoder and a Forward Error Correction (FEC) decoder.

The MAC layer 250 may construct Medium Access Control Packet Data Unit (MAC PDU) by selecting an appropriate transmission channel for transmitting data dedicated for multiplexing logical channels and mapping between logical channels and transmission channels and by processing Medium Access Control Service Data Unit (MAC SDU) received from a higher layer. In addition, the MAC layer 250 may perform data multiplexing between component carriers in case that retransmission of HARQ, scheduling uplink and downlink and carrier aggregation. The MAC layer 250 may be connected to the PHY layer 260 through the transmission channel.

Such a MAC layer 250 may include a Wi-Fi P2P MAC layer 252 for Wi-Fi Pear to Pear (P2P) connection.

FIG. 3 illustrates another example of inner block diagram of a Wi-Fi device proposed by the present invention.

The Wi-Fi device may include a transceiver antenna 310, a wireless communication unit 320, a user input unit 330, a memory 340, a power supply 350, a control unit 360, an interface unit 370, an output unit 380, an Audio/Video input unit 390, etc. The elements shown in FIG. 3 are not essential, but the Wi-Fi device may be implemented by elements more or less than those shown in FIG. 3.

Hereinafter, the elements will be described one by one.

The transceiver antenna 310 plays the role of receiving signals that other devices transmit or transmitting signals to the other devices. One transceiver antenna 310 is shown for the device, but may include a plurality of antennas. Accordingly, the device according to the present invention may support Multiple Input Multiple Output (MIMO) system.

The wireless communication unit 320 may include one or more modules that enable to perform wireless communication between the device and a wireless communication system or the device and network where the device is located. For example, the wireless communication unit 320 may include a broadcasting receiving module 322, a mobile communication module 324, a wireless internet module 326 and a local area network communication module 328.

The wireless communication unit 320 may be called a transceiver unit.

The broadcasting receiving module 322 receives broadcasting signals and/or information related to broadcasting from an external broadcasting management server through a broadcasting channel.

The broadcasting channel may include a satellite channel or a terrestrial channel. The broadcasting management server may mean a server that generates and transmit the broadcasting signals and/or information related to broadcasting or a server that is provided with the broadcasting signals and/or information related to broadcasting already generated and transmits it to a terminal. The broadcasting signals may include broadcasting signals in the combined form of TV broadcasting signals or radio broadcasting signals and data broadcasting signals as well as TV broadcasting signals, radio broadcasting signals and data broadcasting signals.

The information related to broadcasting may mean information related to broadcasting channels, broadcasting programs or broadcasting service providers. The information related to broadcasting may also be provided through mobile communication network. In this case, the information related to broadcasting may be received by the mobile communication module 324.

The information related to broadcasting may exist in various forms. For example, the information related to broadcasting may exist in a form of Electronic Program Guide (EPG) of Digital Multimedia Broadcasting (DMB), Electronic Service Guide (ESG) of Digital Video Broadcast Handheld (DVBH), or etc.

The broadcasting receiving module 322 receives broadcasting signals using various broadcasting systems. Particularly, the broadcasting receiving module 322 may receive digital broadcasting signals using digital broadcasting systems such as Digital Multimedia Broadcasting Terrestrial (DMBT), Digital Multimedia Broadcasting Satellite (DMBS), Media Forward Link Only (MediaFLO), Digital Video Broadcast Handheld (DVBH), Integrated Services Digital Broadcast Terrestrial (ISDBT), etc. Of course, the broadcasting receiving module 322 may be constructed to be suitable for other broadcasting systems that provides broadcasting signals as well as the digital broadcasting systems mentioned above.

The broadcasting signals and/or information related to broadcasting received through the broadcasting receiving module 322 may be stored in the memory 340.

The mobile communication module 324 transmits or receives radio signals to/from at least one of a base station, an external terminal and a server on a mobile communication network. The radio signals may include various shapes of data according to transmitting and receiving voice call signals, video call signals or text/multimedia message.

The wireless internet module 326 means a module for wireless internet access, and may be built in or outside of a device. As wireless internet technologies, Wireless LAN (WLAN; Wi-Fi), Wireless broadband (Wibro), World Interoperability for Microwave Access (Wimax), High Speed Downlink Packet Access (HSDPA), etc.

Through the wireless internet module 326, the device may perform Wi-Fi Pear to Pear (P2P) connection with other devices. Through such a Wi-Fi P2P connection, streaming services between devices may be provided, and printing services may be provided by transmitting/receiving data or with being connected to a printer.

The local area network communication module 328 means a module for performing local area network communication. As the local area network communication technology, Bluetooth, Radio Frequency Identification (RFID), infrared Data Association (IrDA), Ultra Wideband (UWB), ZigBee, etc.

The Audio/Video input unit 390 is designed to input audio signals or video signals, and may include a camera 392, a mike unit 394, etc. The camera 392 processes image frames such as still images or video images obtained by an image sensor in a video call mode or a shooting mode. The image frames processed may be displayed on the display module 382.

The image frames processed in the camera 392 may be stored in the memory 340 or transmitted outside through the wireless communication unit 320. Two or more cameras 392 may be provided according to a construction aspect of construction of a terminal.

The mike unit 394 receives external sound signals via a microphone in a record mode or a voice recognition mode, etc. and processes it to electrical voice data. In case of a call mode, the processed voice data may be transformed into a form that is available to be transmitted to a mobile communication base station through the mobile communication module 324 and outputted. In the mike unit 394, various noise removal algorithms may be implemented for removing noises occurred in the process of inputting external sound signals.

The user input unit 330 may generate input data for operation control of a terminal by a user. The user input unit 330 may include a key pad, a dome switch, a touch pad (static pressure type/capacitive type), a jog-wheel, a jog-switch, etc.

The output unit 380 is designed to generate output in relation to sight, hearing or touch sense, and may include a display module 382, a sound output module 384, etc.

The display module 382 displays the information processed by the device. For example, in case that the device is in call mode, the display module 382 displays user interface (UI) or graphic user interface (GUI) in relation to the call. In case that the device is in a video call mode or a shooting mode, the display module 382 displays the shoot images or/and received images, UI or GUI.

The display module 382 may include at least one of a liquid crystal display, a thin film transistor liquid crystal display, an organic light emitting diode, a flexible display and a 3D display.

The sound output module 384 may output audio data received from the wireless communication unit 320 or stored in the memory 340 in a call signal receiving mode, a call mode, a recording mode, a voice recognition mode, a broadcasting receiving mode, etc. The sound output module 384 outputs sound signals in relation to functions (i.e., call signal receiving sound, message receiving sound, etc.) performed in the device. The sound output module 384 may include a receiver, a speaker, a buzzer, etc.

The memory 340 may store programs for operating the control unit 360, and may temporarily store input/output data (i.e., phone book, message, still image, video image, etc.). The memory 340 may store data in relation to various patterns of vibration and sound outputted when receiving touch inputs on the touch screen.

The memory 340 is a media that stores various information of the terminal, and may store programs for operating the control unit 360, applications, common files and input/output data with being connected to the control unit 360.

The memory 340 may include at least one type of a flash memory type, a hard disk type, a multimedia card micro type, a card type memory (i.e., SD or XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk and an optical disk. The device may be operated in relation to a web storage that performs a storage function of the memory 340.

The interface unit 370 may play the role of a passage through all external devices that are connected to the device. The interface unit 370 enables to receive data or power from external devices and forward it to each element in the device, or transmit data in the device to external devices. For example, the interface unit 370 may include a wired/wireless headset port, a external charger port, a wired/wireless data port, a memory card port, a port for connecting device provided with a recognition module, an audio input/output (I/O) port, a video input/output (I/O) port, an earphone port, etc.

The control unit 360 may instruct or manage all operations of the device, and operate with being connected to each of the devices. For example, the control unit 360 may instruct the wireless communication unit 320 to transmit a Probe Request Frame to other devices in order to perform Wi-Fi P2P connection with other devices, and may control the procedure for determining a Group Owner when forming a group with other devices.

The control unit 360 may also be called a controller, a micro controller, a microprocessor, etc., and the control unit 360 may be implemented by hardware, firmware, software, or a combination of these.

FIG. 4 is a diagram schematically illustrating a functional aspect of internal configuration of a Wi-Fi device proposed by the present invention.

Referring to FIG. 4, as functional elements for peer to peer (P2P) connection of a Wi-Fi device, a user interface application 440, a service type 430 and a common platform 420 may be included.

The elements shown in FIG. 4 are not essential, but the Wi-Fi device may be implemented by elements more or less than those shown in FIG. 4.

In detail, the user interface application 440 may provide interfaces to a user according to each of the service types. For example, in case of providing a service in relation to playback in the service types, the user interface application 440 may play the role of providing an interface that enables to control media files to be played to a user.

The service type may represent service types that are available to be provided in the Wi-Fi device. The Wi-Fi device may provide various services including data transmission to other devices, playing media files, outputting pictures or image files, or printing out documents with being connected to a printer, through Wi-Fi P2P connection. Such service types are not limited to the mentioned types, but various types may be provided.

The application service platform 420 may perform the role of delivering signals received from support functions of the services and a user to the Wi-Fi MAC/PHY 410.

The Wi-Fi MAC/PHY 410 may play the role of receiving signals related to Wi-Fi from a higher layer and transmitting it to other devices by processing or transmitting the received data to a higher layer by processing.

FIG. 5 illustrates an example of group formation of devices in a Wi-Fi P2P system proposed by the present invention.

The Wi-Fi P2P connection may form a group through P2P connection between devices and support data transmission and various services.

In detail, it may be understood that the ellipses representing a first group 510 and a second group 520 may show coverage areas that the devices included in the corresponding group maintain. In these areas, members of the group may be dynamically changed due to turn on, turn off of the device, or entering or leaving the areas.

In the first group 510, a first device 512 and a second device 514 form a group through P2P connection, and in the second group 520, a third device 522 and a fourth device 524 form a group through P2P connection.

Through such a Wi-Fi P2P group formation, the devices may provide Wi-Fi P2P services such as data transmission/reception, streaming service, print out, etc.

The present invention has an object to provide a method and apparatus for efficient P2P connection by decreasing a time consumed for paring procedures between devices in P2P connection between devices.

FIG. 6 illustrates a device discovery procedure of P2P devices in a Wi-Fi direct system.

The device discovery procedure may be performed by processes of searching a neighboring device available to perform Wi-Fi P2P connection with, and changing channel to a channel for providing Wi-Fi P2P service with a selected device among the searched devices.

Referring to FIG. 6, in detail, the Wi-Fi device discovery procedure may be divided into a Scan Phase (step, S610) for searching an operation channel or searching neighboring P2P groups or P2P devices and a Find Phase for finding neighboring devices in a Social Channel. Here, in the Find Phase, the devices may be existed in Search State (step, S630) for transmitting a Probe Request Frame from the Social Channel and Listen State (step, S620) for receiving a Probe Request Frame transmitted from other device.

The Probe Request Frame may include a Peer to Peer Information Element (P2P IE), a P2P Wildcard SSID element, a Wildcard BSSID, address information and a WSC Information Element (WSC IE).

In the Scan Phase (step, S610), a first device 610 and a second device 620 may search an optimal Operation Channel for finding other devices or neighboring P2P group or forming a P2P group.

In the Scan Phase (step, S610), the first device 610 and the second device 620 may scan all channels, and through this, may obtain information related to neighboring devices or networks. In such a Scan Phase, the device is unable to respond the Probe Request Frame, and all of the devices that are trying to perform P2P connection may execute scan.

When the Scan Phase (step, S610) is terminated, the first device 610 and the second device 620 may be operated in a Listen State (step, S620) of the Fine Phase.

In the Listen State (step, S620), in case that the first device 610 and the second device 620 are not belonged to a P2P group, the first device 610 and the second device 620 may be stayed in a specific Listen Channel in order to form a P2P group. The Listen Channel represents a channel selected from Social Channels.

The Social Channels mean three channels among channels in 2.4 GHz band.

In the Listen State (step, S620), the first device 610 and the second device 620 may transmit a Probe Response Frame in response to the Probe Request Frame of other devices existed in the same Social Channel.

In the Search State (step, S630), the first device 610 and the second device 620 may transmit the Probe Request Frame in all Social Channels for P2P connection.

The first device 610 and the second device 620 may be repeatedly operated in the Listen State (step, S620) and the Search State (step, S630), and a time exited in the Listen State (step, S620) may be arbitrarily determined.

P2P connection is available in case that the first device 610 and the second device 620 are existed in the Listen State (step, S620) and the Search State (step, S630) or in the Search state (step, S630) and the Listen State (step, S620), respectively, in the repeated operation.

In FIG. 6, the second device 620 may transmit a Probe Request Frame to the first device 610 through the Social Channel in the Search State (step, S630).

The Probe Request Frame may be transmitted in every Social Channel, and is available to be responded only in case that the first device 610 is in the same channel. In FIG. 6, the second device 620 may transmit a Probe Request Frame in channel 1 and channel 6 (step, S642), and the first device 610 transmits a Probe Response Frame to the second device 620 in response to the Probe Request Frame which is transmitted by the second channel 2 620 in channel 6 (step, S640).

The Probe Request Frame may be transmitted in a message format, and include information represented in Table 1 below.

TABLE 1

| Order | Information Element |
|---|---|
|  | WSC IE |
| Last | P2P IE |

In Table 1 above, WSC IE may also include information represented in Table 2 below.

TABLE 2

| Attributes | Required/Optional |
|---|---|
| Device Name | Required |
| Primary Device Type | Required |
| Device Password ID | Required |
| Requested Device Type | Optional |

In Table 2 above, the Device Name may mean a name of device that transmits the Probe Request Frame, and the Primary Device Type may mean a type of device that transmits the Probe Request Frame. The Device Name, Primary Device Type and Device Password ID are information that should include the Probe Request Frame, but the Request Device Type is optional element.

P2P IE in Table 1 above may include information represented in Table 3 below, which is information for P2P connection.

TABLE 3

| Field | Size (Octets) | Value | Description |
|---|---|---|---|
| Element ID | 1 | 0xDD | IEEE 802.11 vendor specific usage |
| Length | 1 | Variable |  |
| OUI | 1 | 50 6F 9A | WFA specific OUI |
| P2P Attributes | variable |  |  |

Table 3 above represents general format of P2P IE, and the format represented in Table 1 to Table 3 above is a format which is commonly used in the Probe Request Frame, a Probe Response Frame, a Group Owner Negotiation Request Frame, a Group Owner Negotiation Response Frame and a Group Owner Negotiation Confirmation Frame. The P2P Attributes may include attributes that are changed depending on a sort of frame or message that the device transmits.

Table 4 below represents information included in the P2P Attributes.

TABLE 4

| Field | Size (Octets) | Value | Description |
|---|---|---|---|
| Attribute ID | 1 | variable | Identifying the type of P2P attribute |
| Length | 2 | variable | |
| Attribute body field | variable | | |

In Table 4 above, the Attribute ID is a field that represents a type of P2P Attributes, and the Attribute body field may represent information included in each of P2P Attributes.

The Probe Request Frame may include the P2P Attributes represented in Table 5 below.

TABLE 5

| Attributes | Attribute ID |
|---|---|
| P2P Capability | 2 |
| P2P Device ID | 3 |
| Listen Channel | 6 |
| Extended Listen Timing | 8 |
| Operating Channel | 17 |

The Listen Channel in Table 5 above may include channel information of a device in Listen State and information related to Operating Class, and the Extended Listen Timing may include information related to a time of valid Listen State. The Operating Channel may include information related to Operation Channel which is searched through the Scan Phase.

The information included in P2P Attributes of the Probe Response Frame that the second device 620 transmits in response to the Probe Request Frame is represented in Table 6 below.

TABLE 6

| Attributes | Attribute ID |
|---|---|
| P2P Capability | 2 |
| Extended Listen Timing | 8 |
| Notice of Absence | 12 |
| P2P Device Info | 13 |
| P2P Group Info | 14 |

The Notice of Absence may be included in case that a Group Owner notifies the Notice of Absence Schedule through a beacon frame.

The first device 610 that receives the Probe Response Frame may find the second device 620, and try to perform P2P connection with the second device 620.

However, such a device discovery procedure is available to be connected only if devices are existed in different states with each other, that is, in Listen State and Search State in an initial Pairing Procedure, which depends on arbitrary probability, and accordingly, may take long time.

In addition, in the Scan Phase, since the result of the search for surroundings of the device or network and the scan of optimal Operation Channel are similar for each device, not all devices are required to perform scan.

Accordingly, in order to solve the problems, a method and apparatus that enables to perform the P2P connection efficiently will be described.

FIG. 7 is a flowchart illustrating an example of a Wi-Fi P2P connection procedure proposed by the present invention.

In order to perform Wi-Fi P2P connection, a first device may perform Wi-Fi P2P connection through search for neighboring devices, determining Group Owner with any one device (hereinafter, referred to "a second device") among the searched one or more devices, channel scan for communication, and channel change with the second device.

Referring to FIG. 7, first, the first device searches neighboring devices for Wi-Fi P2P connection (step, S710). Here, the first device finds the second device that is trying to perform P2P connection with the searched devices and performs P2P connection procedure with the second device which is found.

Later, the first device may determine a Group Owner through a Group Owner negotiation process with the second device (step, S720), and the Group Owner which is determined (the first device or the second device) searches an optimal Operation Channel for communication through P2P connection (step, S730). Here, the Group Owner may search all of the channels, neighboring devices, P2P groups which are formed, states of network, etc. that may be supported in the process of searching an optimal Operation Channel.

Then, the Group Owner transmits the information related to the optimal Operation Channel which is searched to other device (a device which is not the Group Owner) within the group. Later, the Group Owner and the other device change channel to the optimal Operation Channel which is searched (step, S740).

FIG. 8 is a flowchart illustrating an example of a method for scan channels in a Wi-Fi P2P connection procedure proposed by the present invention.

After the first device 610 and the second device 620 finish the search for counterpart, only the device which is determined to be a Group Owner (G.O) scans an Operation Channel for providing P2P services.

In describing in detail with referring to FIG. 8, the first device 610 and the second device 620 find each other through transmitting a Probe Request Frame and a Probe Response Frame in a Find Phase, like the Device Discovery procedure shown in FIG. 6.

That is, the first device 610 transmits a Probe Request Frame to the second device 620 in channel 6 (step, S810). In this time, if the second device 620 is existed in channel 6 among the Social Channels, the second device 620 may receive the Probe Request Frame.

The second device 620 transmits a Probe Response Frame to the first device 610 in response to the Probe Request Frame (step, S820). The first device 610 and the second device 620 may exchange device information with each other through the Probe Request Frame and the Probe Response Frame.

Then, the first device 610 and the second device 620 determine a Group Owner through a Group Owner negotiation procedure (step, S830). The Group Owner negotiation procedure will be described below by reference to the drawings.

Hereinafter, it is assumed and described the case that the first device 610 is determined to be a Group Owner.

After the first device 610 is determined to be a Group Owner, the first device 610 scans an optimal Operation Channel in order to provide data transmission/reception, streaming, output service, and so on to a user (step, S840).

Through the scanning process, the first device 610 may scan other neighboring devices, P2P groups, or network states, etc., and search an optimal Operation Channel that may provide Wi-Fi P2P services.

Since the results of scanning process are not so different for devices in Wi-Fi P2P connection, it is unnecessary procedure that all devices perform scan, which consumes battery that may not be consumed. Accordingly, unnecessary operations may be omitted by performing channel scanning only by a device determined to be a Group Owner in Wi-Fi P2P connection.

Later, the first device 610 may transmit the information related to the selected operation channel to the second device 620.

In case that the second device 620 receives information related to the selected operation channel from the first device 610, the second device 620 transmits an ACK response frame to the first device 610 in response (step, S860).

The first device 610 and the second device 620 may know on which is the selected channel from the transmission of the selected channel information, and change channel to the selected channel in order to provide P2P services (step, S870).

FIG. 9 is a flowchart illustrating an example of a method for searching neighboring devices in a Wi-Fi P2P connection procedure proposed by the present invention.

Referring to FIG. 9, search for neighboring devices may be performed within one procedure with waiting time for a Listen State of the Device Discovery procedure and a section for transmitting Probe Request Frame of the Search State being not separately exist.

In describing in detail with referring to FIG. 9, the first device 610 may transmit a Probe Request Frame to the second device 620 in channel 1 among the social channels for Wi-Fi P2P connection with the second device 620 among neighboring devices (step, S910).

After transmitting the Probe Request Frame in channel 1, the first device 610 may be operated in an answer hold state for an arbitrary time in order to receive a Probe Response Frame from the second device 620.

In case that the first device 610 is unable to receive the Probe Response Frame from the second device 620 for the answer hold time, the first device 610 may retransmit a Probe Request Frame to the second device in channel 1 (step, S920), and operated in an answer hold state again.

However, in case that the second device 620 is not in the same social channel with the first device 610, the second device 620 may not receive the Probe Request Frame from the first device 610. Accordingly, the second device 620 may not transmit the Probe Response Frame to the first device 610.

The second device 620 may also transmit a Probe Request Frame to the first device 610 in channel 11 among social channels similar to the first device 610 (step, S930), and may wait for a response time.

In addition, the first device 610 may also retransmit a Probe Request Frame to the second device 620 by changing channel 1 to channel 11, and may wait for a response time (step, S940).

In case that the second device 620 may not receive the Probe Request Frame in channel 11 for the wait time, the second device 620 may transmit the Probe Request Frame in channel 1 among social channels by changing channel (step, S950).

When the first device 610 transmits a Probe Request Frame to the second device 620 in channel 1, if the second device 620 waits response in channel 1, the second device 620 may receive the Probe Request Frame (step, S960).

The second device 620 that receives the Probe Request Frame may transmit a Probe Response Frame to the first device 610 in response to this, and the first device 610 and the second device 620 may find each other and exchange information respectively through the Probe Request Frame and the Probe Response Frame.

In FIG. 9, the social channels for transmitting the Probe Request Frame by the first device 610 and the second device 620 are channel 1 and channel 10, that is, two social channels which are less than the existing three channels are used, and the device search time may be decreased by integrating the Find Phase which is divided into the Listen State and the Search State described in FIG. 6.

In addition, a probability for finding the second device 620 may be increased by allocating time when a specific device stays in a specific channel longer by asymmetrically allocating response wait time for each social channel, that is, by making the first device 610 stay in channel 1 longer.

Through this, not responding the Probe Response Frame in only a specific state, but responding in case of receiving the Probe Request Frame and in the same channel, thereby performing device search faster.

FIG. 10 is a diagram illustrating a Group Owner Negotiation procedure of a group of P2P devices in a Wi-Fi Direct system.

After the Device Discovery procedure of the P2P devices, the first device 610 may perform a Group Owner Negotiation procedure for determining a Group Owner with a searched device (the second device 620 in the drawing).

In describing in detail with referring to FIG. 9, the first device 610 may find the second device 20 and exchange a Probe Request Frame and a Probe Response Frame, then, transmit a Group Owner Negotiation Request Frame for Group Owner negotiation to the second device (step, S1010).

The Group Owner Negotiation Request may also be transmitted in a format of message as well as the frame format.

The Group Owner Negotiation Request Frame may include the P2P IE which is described above, and the P2P IE may include the following information represented in Table 7 below.

TABLE 7

| Attributes | Attribute ID |
| --- | --- |
| P2P Capability | 2 |
| Group Owner Intent | 4 |
| Configuration Timeout | 5 |
| Listen Channel | 6 |
| Extended Listen Timing | 8 |
| Intended P2P Interface Address | 9 |
| Channel List | 11 |
| P2P Device Information | 13 |
| Operation Channel | 17 |

The P2P Capability represents attributes of the P2P group which is formed, and the Group Owner Intent may include the following information represented in Table 8 below.

TABLE 8

| Field | Size (Octets) | Value |
|---|---|---|
| Attribute ID | 1 | 4 |
| Length | 2 | 1 |
| GO Intent | 1 | variable |

The GO Intent field may include information for determining a Group Owner, and may include information represented in Table 9 below.

TABLE 9

| Bit(s) | Information | Value |
|---|---|---|
| 0 | Random value | 0 or 1 |
| 1-7 | Intent | 0-15 |

The Intent value is a value for determining a Group Owner, and may have a value from 0 to 15. The Group Owner is determined by comparing Intent values included in the Group Owner Negotiation Request Frame and the Group Owner Negotiation Response Frame. The Random value is determined by a value from 0 to 1, and if the Intent values are identical, the Group Owner may be determined by comparing the Random value.

The Configuration Timeout may represent a maximum time required to go over to Wi-Fi Provisioning Phase after the Group Owner is determined.

The first device 610 may receive the Group Owner Negotiation Response Frame from the second device 620 in response to the Group Owner Negotiation Request Frame (step, S1020).

The Group Owner Negotiation Response Frame may include the Peer to Peer Information Element (P2P IE) and the WSC Information Element (WSC IE), and the P2P IE may include information represented in Table 10 below.

TABLE 10

| Attributes | Attribute ID |
|---|---|
| Status | 0 |
| P2P Capability | 2 |
| Group Owner Intent | 4 |
| Configuration Timeout | 5 |
| Operation Channel | 17 |
| Intended P2P Interface Address | 9 |
| Channel List | 11 |
| P2P Device Information | 13 |
| P2P Group ID | 15 |

The Status represents on whether the second device 620 is available to perform a Group Owner Negotiation, and may be represented as Success or Fail.

The Group Owner Negotiation Request Frame and the Group Owner Negotiation Response Frame include the WSC IE in addition to the P2P IE, and the WSC IT may include information represented in Table 11 below.

TABLE 11

| Attribute | Required/Optional | Allowed Values |
|---|---|---|
| Version | Required | 0x10 = version1.0, 0x11 = version 1.1, etc |
| Device Password | Required | |
| <Other> | Optional | |

The first device 610 and the second device 620 that acquire information included in the Group Owner Negotiation Request Frame and the Group Owner Negotiation Response Frame may determine a Group Owner by using Intent value or Random value included in the Group Owner Negotiation Request Frame and the Group Owner Negotiation Response Frame.

In case that the Group Owner is determined or not, the first device 610 may transmit a Group Owner Negotiation Confirmation Frame to the second device 620 (step, S1040).

The Group Owner Negotiation Confirmation Frame may include information represented in Table 12 below.

TABLE 12

| Attributes | Attribute ID |
|---|---|
| Status | 0 |
| P2P Capability | 2 |
| Operation Channel | 17 |
| Channel List | 11 |
| P2P Group ID | 15 |

The Status in Table 12 represents whether the Group Owner negotiation procedure is Success or Fail. In case that the Group Owner is determined in the procedure, the Status may be set a value representing Success, and may be set a value representing Fail in case that the Group Owner is not determined.

The procedure of determining a Group Owner may be terminated according to transmission of the Group Owner Negotiation Confirmation Frame even in case of not being determined as well as the Group Owner is determined. However, in case that a Group Owner is not determined, the same procedure may be repeatedly performed.

FIG. 11 is a flowchart illustrating an example of a Group Owner Negotiation procedure proposed by the present invention.

Referring to FIG. 11, in the Group Owner Negotiation procedure, a Group Owner may be determined by comparing information included in the Group Owner Negotiation Request Frame and the Group Owner Negotiation Response Frame.

In more detail, the description for step S1110 and step 1120 will be omitted since step S1110 and step 1120 are identical to step S1010 and S1020, respectively.

The first device 610 and the second device 620 may compare a first Intent value included in the Group Owner Negotiation Request Frame and a second Intent value included in the Group Owner Negotiation Response Frame in order to determine a Group Owner (step, S1130).

In the comparison process, it may be compared whether the first Intent value and the second Intent value are identical or whether any one is greater (step, S1140). As a result of the comparison, a device having greater value among the first Intent value and the second Intent value may be determined as the Group Owner (S1170).

However, in case that the first Intent value and the second Intent value are identical, that is, both of the first Intent value and the second Intent value are 15, the Group Owner Negotiation procedure is failed. And in case that both of the first Intent value and the second Intent value are not 15, the first device 610 and the second device 620 may compare a first random value included in the Group Owner Negotiation Request Frame and a second random value included in the Group Owner Negotiation Response Frame (step, S1150).

The first random value and the second random value are determined between 0 and 1.

In case that the first random value and the second random value are not identical, a device that has a value of 1 among the first random value and the second random value may be determined as a Group Owner (step, S1170).

However, in case that the first random value and the second random value are identical, the Group Owner Negotiation procedure is failed and the Group Owner is not determined in the procedure.

In case that the Group Owner Negotiation procedure is failed, the first device 610 may transmit a Group Owner Negotiation Confirmation Frame to the second device 620, and the Status Field of the Group Owner Negotiation Confirmation Frame include information that represents Fail.

In case that the Group Owner Negotiation procedure is succeeded, the first device 610 may transmit a Group Owner Negotiation Confirmation Frame to the second device 620, and the Status Field of the Group Owner Negotiation Confirmation Frame include information that represents Success (step, S1180).

The first Intent value and the second Intent value are values that are fixed when the first device 610 and the second device 620 are manufactured, and may be determined based on different standard for manufactures. Accordingly, the method of determining a Group Owner using the first Intent value and the second Intent value has low efficiency. Therefore, a method of negotiating a Group Owner by dynamically determining an Intent value depending on a state of devices and surroundings will be described below.

FIG. 12 is a flowchart illustrating another example of a Group Owner Negotiation procedure proposed by the present invention.

Referring to FIG. 12, the devices may determine a Group Owner by newly generating an Intent value whenever performing the Group Owner Negotiation procedure.

In describing in detail, the first device 610 may determine a first Intent value in order to perform the Group Owner Negotiation procedure (step, S1210). The first Intent value may be dynamically determined depending on a state of the first device 610 and surroundings.

The first device 610 may transmit the determined first Intent value to the second device 620 with being included in the Group Owner Negotiation Request Frame (step, S1220).

The second device 620 that receives the Group Owner Negotiation Request Frame may determine a second Intent value for the Group Owner Negotiation (step, S1230). The second Intent value is a value determined in the same way of the first Intent value.

The second device 620 may transmit the determined second Intent value to the first device 610 with being included in the Group Owner Negotiation Response Frame (step, S1240).

The first device 610 and the second device 620 may obtain the first Intent value and the second Intent value through the Group Owner Negotiation Request Frame and the Group Owner Negotiation Response Frame, and through this, a Group Owner may be determined (step, S1250).

In case that the Group Owner is determined, the first device 610 may transmit a Group Owner Negotiation Confirmation Frame to the second device 620.

However, even in case that the Group Owner is not determined, the first device 610 may transmit a Group Owner Negotiation Confirmation Frame to the second device 620 and terminate the procedure, and perform the same procedure again.

FIG. 13 is a flowchart illustrating yet another example of a Group Owner Negotiation procedure proposed by the present invention.

Referring to FIG. 13, the first device 610 and the second device 620 generate a first Intent value and a second Intent value, respectively for the Group Owner Negotiation procedure, and compare these values, thereby determining a Group Owner.

In describing in detail, the first device 610 may determine a first Intent value in order to perform the Group Owner Negotiation procedure. The first Intent value may be determined depending on a state of the first device 610 and surroundings of the first device 610 (step, S1310).

The first device 610 transmits the determined first Intent value to the second device 620 with being included in the Group Owner Negotiation Request Frame (step, S1320).

The second device 620 that receives the Group Owner Negotiation Request Frame determines a second Intent value for the Group Owner Negotiation (step, S1330). The second Intent value may be determined depending on a state of the second device 620 and surroundings of the second device 620.

Later, the second device 620 transmits the determined second Intent value to the first device 610 with being included in the Group Owner Negotiation Response Frame (step, S1340).

Later steps, step S1350 to step S1400 will be omitted since step S1350 to step S1400 are the same as step S1130 to step S1180, respectively, described by referring to FIG. 11.

FIG. 14 is a diagram illustrating a method for dynamically determining an Intent value proposed by the present invention.

Referring to FIG. 14, the Intent value may be determined by a state of device itself and a parameter related to surroundings multiplied by a Scale Factor.

In describing this in detail, a device may be inputted a plurality of parameters in order to determine the Intent value. The parameters may be divided by General Parameters and Specific Parameters, and the General Parameters may be determined by considering a state of the device itself and surroundings of the device.

Table 13 below represents parameters that may be included in the General Parameters.

TABLE 13

| Parameter | Description |
| --- | --- |
| Remained Energy | Battery remains remained in a device<br>(Represented higher value as the battery remains are higher) |
| Supplied Power Method | Whether power is fixedly serviced by Adaptor or something<br>(Setting higher than the battery remains if power is fixedly serviced) |
| Assigned Computing Resource | Average Computing Resources currently remained such as CPU, Memory, etc.<br>(Average value for recent time t) |

TABLE 13-continued

| Parameter | Description |
| --- | --- |
| Ability of Concurrent Operation | Whether it is available to perform Concurrent Operation of Wi-Fi Direct (Setting parameter value lower since it is highly possible to perform the Concurrent Operation later, if it is available) |
| Current Usage of Concurrent Operation | Whether Concurrent Operation is operated currently (Setting parameter value lower in case of currently evading Group Owner or operating Group Owner, if Concurrent Operation is operating currently) |
| Num of Multiple Group | Number of Group which is currently affiliated (Setting parameter value lower as Num of Multiple Group is greater) |

The General Parameters are input values such that a device available to perform high calculations and complex functions is to operate functions of Group Owner considering battery remains and calculation capacity of each device. That is, this is to select more proper device as a Group Owner, since a Group Owner should perform a role of an access point (AP) and control a connection configuration, etc., the Group Owner requires high energy capacity and high calculation capacity.

The Specific Parameters are parameters considering use case such as on which role is performed in a group by the device, values determined when manufactured, etc. The Specific Parameters may be divided into Role Values and Manufactured Value again. The Role Values are values according to role section of device, and may be changed according to sorts of device (i.e., a TV, a phone, a PC, a Notebook computer, a Tablet, a HA, etc.).

Table 14 below represents examples of the Role Values.

TABLE 14

| Use-Case | Device Type | Recommended Parameter | Possible Device |
| --- | --- | --- | --- |
| Miracast | Sync | High | TV, Monitor |
|  | Source | Low | Phone, Laptop |
| File Sharing | Peer Device | Middle | Phone, PC, Laptop, Tablet |
| 2nd Screen | 1st Screen Device | High | Phone, PC, Laptop, Tablet |
| 2nd Screen | 2nd Screen Device | Low | TV, Monitor |
| Content Synchronication | Server | High | PC, Laptop |
|  | Source | Low | Phone, Tablet |
| Print | Printing Device | High | Printer, Scanner |
|  | Source | Low | Phone, Laptop, Tablet, PC |

The Manufacturing Intent value is a value determined when a device is manufactured by a manufacturer, and is a fixed value, not dynamic.

The parameter values may be defined from P1 to Pn, and Scale Factors are multiplied to the parameter values (step, S1410). The Scale Factors are differently determined depending on sorts of the parameters, and are defined as SC in FIG. 14. Such an SC is an arbitrary term, but may be called other term. Summation of the Scale Factors becomes 1.

The values with the parameters multiplied by the Scale Factors may be added to the device (step, S1420), digits below decimal point may be eliminated by rounding-off first decimal point, counting fractions as one, rounding down, discarding digits below decimal point (step, S1430).

The same method of eliminating digits below decimal point may be used for devices of the same group. For example, for all of the devices of the same group, digits below decimal point may be eliminated by rounding-off.

If the decimal place is determined, an Intent value may be determined. An algorithm for determining the Intent value may be called Dynamic Intent Value Assignment (DIVA).

However, the term is arbitrary but absolute, and other term may be used.

The existing Intent value may be differently determined for each manufacturer, and is determined when it is manufactured without considering current state and surroundings of the device itself. Accordingly, determination of Group Owner is not efficiently performed.

However, a device that is adequate to the role of Group Owner is available to be determined as a Group Owner by dynamically generating Intent values by considering current state of device itself (e.g., battery remains, battery charge state, etc.) and surroundings (e.g., whether a device belongs to other P2P group, which role a device plays in P2P connection, etc.) through the DIVA algorithm.

In addition, unnecessary battery consumption is decreased, and devices that have low battery remains do not play the role of Group Owner, thereby increasing energy efficiency.

FIG. 15a and FIG. 15b are flowcharts illustrating still another example of a Group Owner Negotiation procedure proposed by the present invention.

Referring to FIG. 15a and FIG. 15b, in case that the Intent value determined when a device is manufactured is identical to a random value, a Group Owner may be determined by dynamically determining an Intent value again.

In describing this in detail, the first device 610 may transmit a $1^{st}$ Group Owner Negotiation Request Frame to the second device 620 (step, S1502). The $1^{st}$ Group Owner Negotiation Request Frame may include a first Intent value, and the first Intent value is a fixed value when the first device 610 is manufactured.

The second device 620 that receives the $1^{st}$ Group Owner Negotiation Request Frame may transmit a $1^{st}$ Group Owner Negotiation Response Frame that includes a second Intent value to the first device 610 (step, S1504).

The first device 610 and the second device 620 that acquire the first Intent value and the second Intent value, respectively through the $1^{st}$ Group Owner Negotiation Request Frame and the $1^{st}$ Group Owner Negotiation Response Frame may compare the first Intent value and the second Intent value (step, S1506).

As a result of the comparison, if the first Intent value and the second Intent value are different, a device that has greater Intent value may be determined to be a Group Owner (step, 1522).

However, if the first Intent value and the second Intent value are identical and the first Intent value and the second Intent value are 15, the Group Owner Negotiation procedure is failed, and a Group Owner Negotiation Confirmation Frame that includes state information instructing to retry the Group Owner Negotiation procedure is sent to the second device (not shown).

If the first Intent value and the second Intent value are identical and the first Intent value and the second Intent value are not 15, a first random value included in the $1^{st}$ Group Owner Negotiation Request Frame and a second random value included in the 1$^{st}$ Group Owner Negotiation Response Frame may be compared (step, S1508).

The first random value and the second random value may have 0 or 1 arbitrarily.

If the first random value and the second random value are different, a device that has a value of "1" may be determined to be a Group Owner (step, S1522). However, if the first random value and the second random value are identical, the Group Owner Negotiation procedure is failed, and a Group Owner Negotiation Confirmation Frame that includes state information instructing to retry the Group Owner Negotiation procedure is sent to the second device (step, S1510).

The first device 610 that fails the first Group Owner Negotiation procedure may determine a third Intent value through the DIVA algorithm described by referring to FIG. 14 (step, S1512), and the second device 620 may also determine a fourth Intent value through the DIVA algorithm (step, S1513).

The first device 610 that determines the third Intent value may transmit the third Intent value with being included in a 2$^{nd}$ Group Owner Negotiation Request Frame to the second device 620 (step, S1514).

The second device 620 that receives the 2$^{nd}$ Group Owner Negotiation Request Frame may transmit the fourth Intent value with being included in the 2$^{nd}$ Group Owner Negotiation Response Frame to the first device 610.

The first device 610 and the second device 620 that acquire the third Intent value and the fourth Intent value, respectively through the 2$^{nd}$ Group Owner Negotiation Request Frame and the 2$^{nd}$ Group Owner Negotiation Response Frame may compare the third Intent value and the fourth Intent value (step, S1518).

As a result of the comparison, if the third Intent value and the fourth Intent value are different, a device that has greater Intent value may be determined to be a Group Owner (G.O) (step, 1522).

However, if the third Intent value and the fourth Intent value are identical and the third Intent value and the fourth Intent value are 15, the Group Owner Negotiation procedure is failed, and a Group Owner Negotiation Confirmation Frame that includes state information representing the Group Owner Negotiation procedure is failed may be sent to the second device 620 (not shown).

If the third Intent value and the fourth Intent value are identical and the third Intent value and the fourth Intent value are not 15, a third random value included in the 2$^{nd}$ Group Owner Negotiation Request Frame and a fourth random value included in the 2$^{nd}$ Group Owner Negotiation Response Frame may be compared (step, S1520).

The third random value and the fourth random value may have 0 or 1 arbitrarily.

If the third random value and the fourth random value are different, a device that has a value of "1" may be determined to be a Group Owner (step, S1522). However, if the third random value and the fourth random value are identical, the Group Owner Negotiation procedure is failed, and a Group Owner is not determined.

If the Group Owner is determined and the Group Owner Negotiation procedure is succeeded, the first device 610 may transmit a Group Owner Negotiation Confirmation Frame that includes state information representing the Group Owner Negotiation procedure is succeeded to the second device 620.

However, if the Group Owner Negotiation procedure is failed since the Group Owner is not determined, the first device 610 may transmit a Group Owner Negotiation Confirmation Frame that includes state information representing the Group Owner Negotiation procedure is failed to the second device 620. In this case, the Group Owner Negotiation procedure may be started over.

Figure 16B:
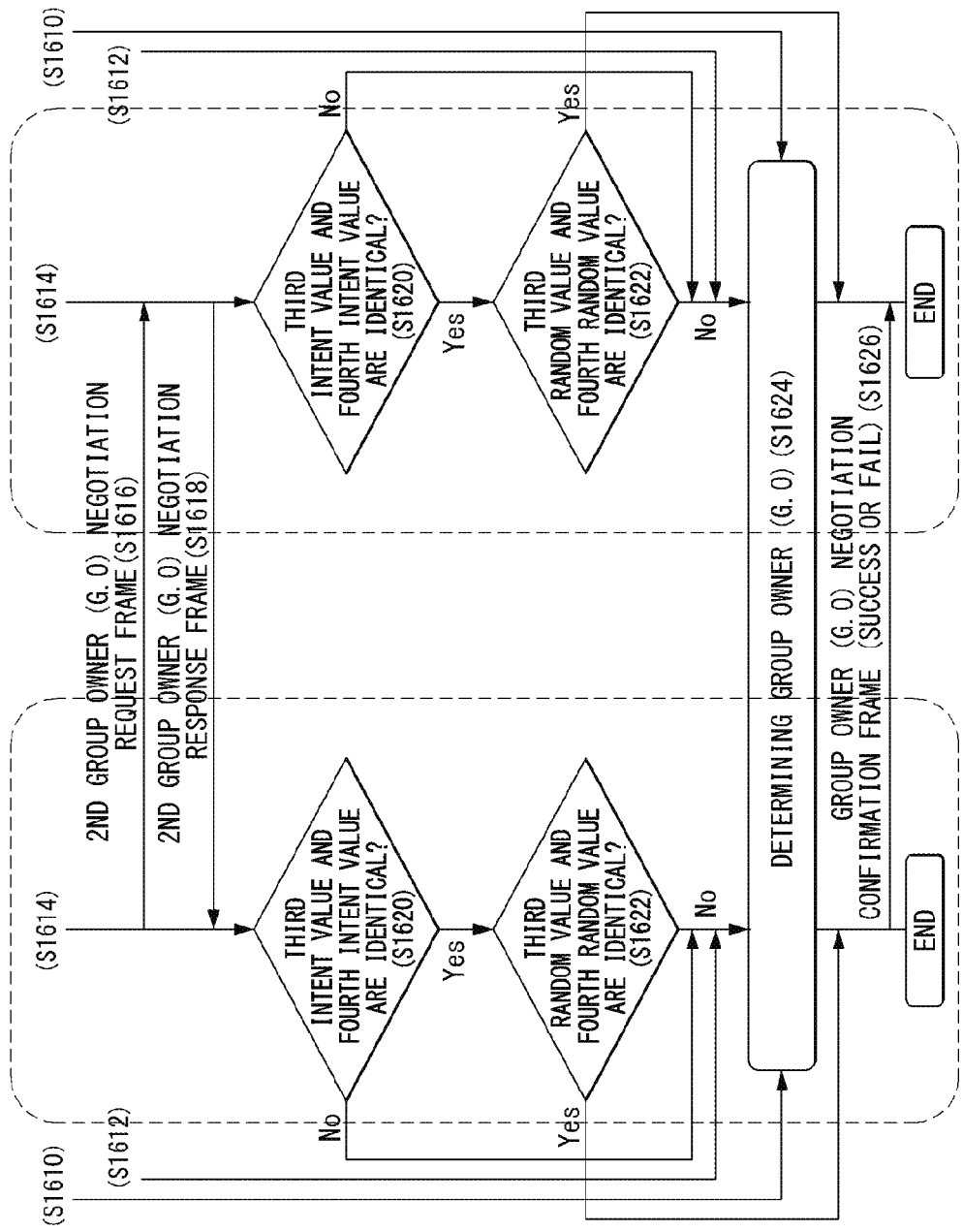

FIG. 16a and FIG. 16b are flowcharts illustrating still another example of a Group Owner Negotiation procedure proposed by the present invention.

Referring to FIG. 16a and FIG. 16b, in case that the Intent values which are dynamically determined considering states and roles of devices are identical, a Group Owner may be determined by using Intent values that are determined when manufactured.

In describing this in detail, the first device 610 and the second device 620 may dynamically determine a first Intent value and a second Intent value through the DIVA algorithm described by referring to FIG. 14 (step, S1602).

Hereinafter, the description for step S1606 to step S1614 will be omitted since it is identical to those of step S1502 to step S1510.

If a Group Owner is not determined in the first procedure, the first device 610 may transmit a 2$^{nd}$ Group Owner Negotiation Request Frame that includes a third Intent value which is determined when manufactured to the second device 620 (step, S1616).

The second device 620 that receives the 2$^{nd}$ Group Owner Negotiation Request Frame may transmit a 2$^{nd}$ Group Owner Negotiation Response Frame that includes a fourth Intent value which is determined when the second device 620 is manufactured to the first device 610 (step, S1618).

Hereinafter, the description for step S1620 to step S1626 will be omitted since it is identical to those of step S1518 to step S1524.

FIG. 17a to FIG. 17d are diagrams illustrating particular embodiments of a Group Owner Negotiation procedure proposed by the present invention.

FIG. 17a illustrates a Group Owner Negotiation procedure by exemplifying a terminal 1710 and a TV 1720.

Through the DIVA algorithm described by referring to FIG. 14, a first Intent value of the terminal 1710 is determined to be 3 and a second Intent value of the TV 1720 is determined to be 12.

The determined first Intent value may be transmitted to the TV 1720 with being included in a Group Owner Negotiation Request Frame (step, S1710).

The TV may transmit a Group Owner Negotiation Response Frame that includes the second Intent value to the terminal 1710, and the terminal 1710 and the TV 1720 may determine the TV 1720 to be a Group Owner by comparing the first Intent value and the second Intent value.

The terminal 1710 may transmit a Group Owner Negotiation Confirmation Frame that includes status information representing the Group Owner Negotiation procedure is succeeded to the TV 1720 (step, 1730).

FIG. 17b above illustrates a Group Owner determination method by exemplifying a first terminal 1730 and a second terminal 1740.

The first terminal 1730 determines a first Intent value to be 4 and the second terminal 1740 determines a second Intent value to be 3 through the DIVA algorithm of FIG. 14.

Accordingly, the first terminal 1730 is determined to be a Group Owner, and the next procedures are the same as those of FIG. 17a.

FIG. 17c above illustrates a Group Owner determination method by exemplifying a terminal 1750 and a PC 1760.

The terminal 1740 determines a first Intent value to be 3 and the PC 1760 determines a second Intent value to be 10 through the DIVA algorithm of FIG. 14.

Accordingly, the PC 1760 is determined to be a Group Owner, and the next procedures are the same as those of FIG. 17*a*.

Figure 17D:
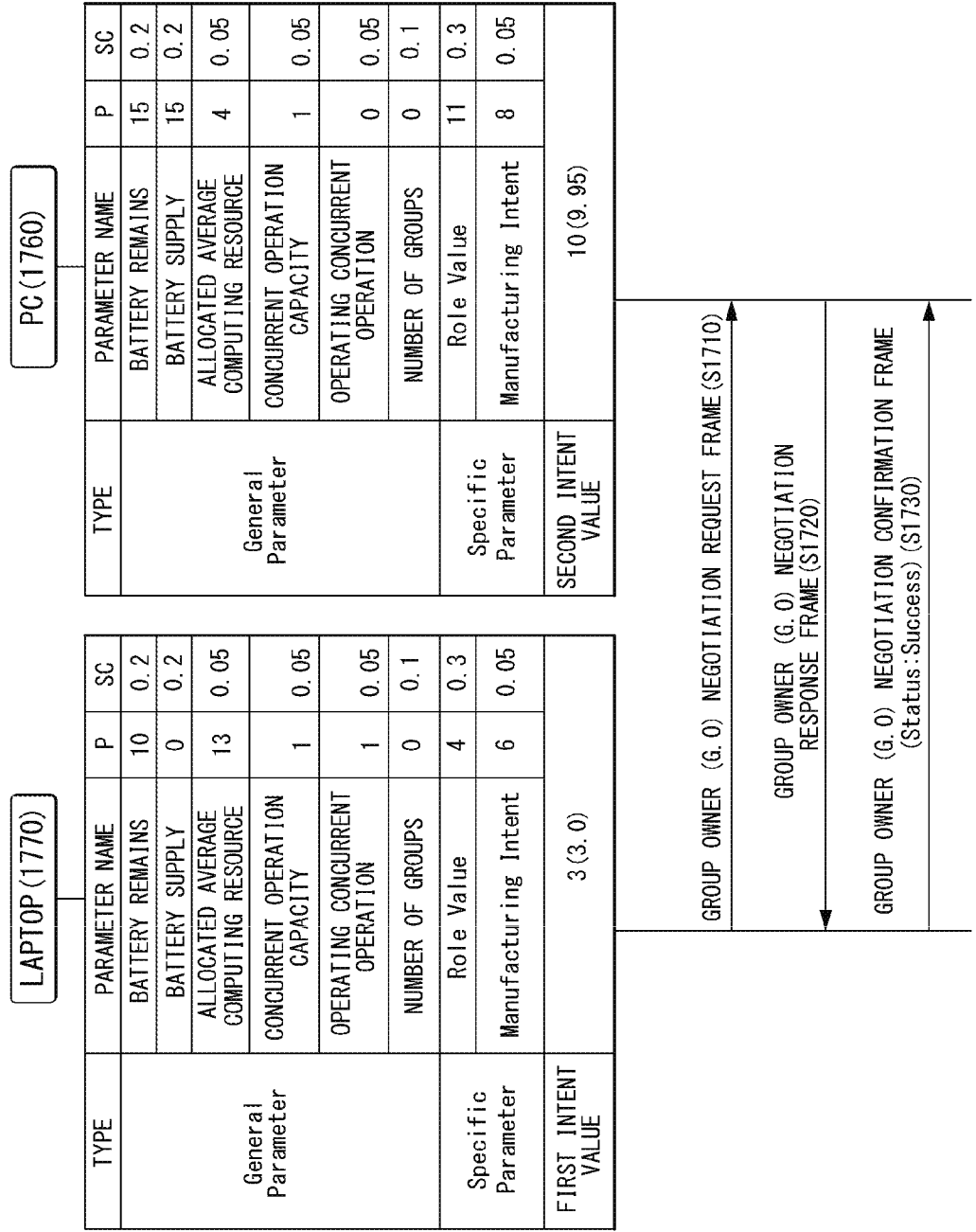

FIG. 17*d* above illustrates a Group Owner determination method by exemplifying a laptop computer 1770 and a printer 1780.

The laptop computer 1770 determines a first Intent value to be 4 and the printer 1780 determines a second Intent value to be 10 through the DIVA algorithm of FIG. 14.

Accordingly, the printer 1780 is determined to be a Group Owner, and the next procedures are the same as those of FIG. 17*a*.

FIG. 18 is a flowchart illustrating an overall procedures for a Wi-Fi P2P connection to which the present invention is applied.

Referring to FIG. 18, the first device 610 may perform a Wi-Fi P2P connection by searching the second device 620 and exchanging device information.

In describing this in detail, the first device 610 transmits a Probe Request Frame in channel 1 and channel 11 among Social Channels in order to search the second device 620.

After the first device 610 transmits a Probe Request Frame in channel 1, the first device 610 waits for a transmission of Probe Request Frame from the second device 620 for an answer hold time in a Listen State, then transmits a Probe Request Frame again.

The first device 610 that does not receive a Probe Request Frame from the second device 620 may transmit a Probe Request Frame again by changing channel. However, even in case that the first device 610 does not receive a Probe Request Frame from the second device 620, the first device 610 may change channel again and transmits a Probe Request Frame in channel 1 (step, S1810).

While the second device 620 transmits a Probe Request Frame in channel 1 and is existed in a Listen State for an answer hold time, then may receive a Probe Request Frame if the first device transmits the Probe Request Frame in channel 1.

Later, in response to this, the second device 620 that receives the Probe Request Frame transmits a Probe Response Frame to the first device 610 (step, S1820).

Here, the answer hold time may be differently configured for each Social Channel.

The first device 610 and the second device may search device with each other and exchange information through the Probe Request Frame and the Probe Response Frame.

The second device 620 transmits a Group Owner Negotiation Request Frame to the first device 610 for the Group Owner Negotiation procedure (step, S1830).

Later, the first device 610 transmits a Group Owner Negotiation Response Frame to the second device 620 in response to the Group Owner Negotiation Request Frame (step, S1840).

The first device 610 and the second device 620 may determine a Group Owner through the Group Owner Negotiation Request Frame and the Group Owner Negotiation Response Frame.

One of the methods described by reference to FIG. 10 to FIG. 17 may be used for the method for determining a Group Owner.

In case that the first device 610 is determined to be a Group Owner, the first device 610 scan all channels which are available to support channel search for providing Wi-Fi P2P service with the second device 620 (step, S1850).

Through the scan process, the first device 610 may search at least one of neighboring devices, P2P groups, states of network or an optimal Operation Channel.

Then, the first device 610 that searches the optimal Operation Channel may transmit a channel scan confirmation frame that includes information related to the optimal Operation Channel to the second device 620 (step, S1860).

The second device 620 may transmit a Group Owner Negotiation Confirmation Frame to the first device 610 (step, S1870), and the first device 610 may change channel to the searched optimal Operation Channel with the second device 620 (step, S1880).

The first device 610 and the second device 620 that change channel to the optimal Operation Channel may provide services through a Wi-Fi P2P connection (step, S1890).

FIG. 19 is another flowchart illustrating an overall procedures for a Wi-Fi P2P connection to which the present invention is applied.

The description for step S1910 to step S1940 of FIG. 19 will be omitted since it is identical to the description of step S1810 to step S1840.

The second device 620 may transmit a Group Owner Negotiation Confirmation Frame to the first device 610 (step, SI 950). The Group Owner Negotiation Confirmation Frame may notice whether the Group Owner Negotiation procedure is succeeded or failed to the first device 610 (step, S1950).

The method for determining a Group Owner may use one of the methods described by reference to FIG. 10 to FIG. 17 above.

In case that the first device 610 is determined to be a Group Owner, the first device 610 may scan channels which are available to support channel search for providing Wi-Fi P2P services with the second device 620 (step, S1960). Through the scan procedure, the first device 610 may search at least one of neighboring devices, P2P groups, states of network or an optimal Operation Channel.

The first device 610 that searches the optimal Operation Channel may transmit a channel scan confirmation frame that includes information related to the optimal Operation Channel to the second device 620 (step, S1970).

The first device 610 and the second device 620 may change channel to the searched optimal Operation Channel (step, S1980).

The first device 610 and the second device 620 that change channel to the optimal Operation Channel may provide services through a Wi-Fi P2P connection (step, S1990).

According to the present invention, by not responding a Probe Request Frame only in a specific state among the Listen State and the Search state of the existing Find Phase, the Device Discovery procedure may be efficiently performed.

In addition, by asymmetrically allocating an answer hold time for each Social Channel, a probability of finding counter device may be increased, and by generating an Intent value that reflects a current state of device itself and surroundings, a proper device may be determined to be a Group Owner.

FIG. 20 is a flowchart illustrating a procedure in which a third device is searched during Wi-Fi P2P connection which is applied to the present invention.

Referring to FIG. 20, in case that a third device 2030 is searched when a first device 2010 and a second device 2020 are tried to perform a Wi-Fi P2P connection, a device may be selected by a user.

In describing this in detail, a method for device search procedure and determining a Group Owner are the same as the methods described by reference to FIG. 19. However, in case of FIG. 20, in case that the third device 2030 transmits a Probe Request Frame in the same Social Channel as the second device 2020 (step, S2010), the second device 2020 may transmit a Probe Response Frame to the third device 2030 (step, S2020).

In addition, in case that the second device 2020 is exited in the same Social Channel as the first device 2010, the second device 2020 may receive a Probe Request Frame from the first device 2010 (step, S2030).

Later, the second device 2020 may transmit a Probe Response Frame to the first device 2010 (step, S2040).

Since the second device 2020 already searched the first device 2010 and the third device 2030, the second device 2020 may decide a device with which P2P connection is performed.

Since the second device 2020 receives a Probe Request Frame from the first device 2010 and the third device 2030 and responds this, both of the first device 2010 and the third device 2030 may search devices which are available to perform a Wi-Fi P2P connection.

Then, the second device 2020 may output the searched device list through a display module, or transmit it to a user device (step, S2050).

The second device 2020 may receive an input of device trying to perform a P2P connection through a user (step, S2060), and perform a P2P connection with the inputted device.

In case that the first device 2010 is selected by a user, the first device 610 and the second device may perform a Group Owner Negotiation procedure.

The description for the next steps S2070 to S2110 will be omitted since it is the same as the description for steps S1930 to S1970.

It will be apparent to those skilled in the art that various substitutions, modifications and variations can be made in the present invention described so far, without departing from the spirit or scope of the inventions by those skilled in the art, and therefore, the present invention is not limited to the described embodiments and the accompanying drawings.

INDUSTRIAL APPLICABILITY

The present specification provides an efficient method and apparatus that decreases a Wi-Fi Peer to Peer (P2P) connection time which is a wireless communication technology.

The invention claimed is:

1. A method for performing communication using Wi-Fi between a first device and a second device, the method being performed by the first device and comprising:
    transmitting a probe request frame through one channel among a plurality of social channels for searching devices that are to perform communication;
    receiving a probe response frame from the second device through a listen channel in response to the probe request frame in a listen state; and
    transmitting a group owner negotiation request frame that includes a first group owner negotiation information to the second device;
    receiving a group owner negotiation response frame that includes a second group owner negotiation information in response to the group owner negotiation request frame from the second device; and
    determining a group owner using the first group owner negotiation information and the second group owner negotiation information,
    wherein the first group owner negotiation information includes a first intent value and a first random value,
    wherein the second group owner negotiation information includes a second intent value and a second random value,
    wherein the first intent value and the second intent value are determined by specific parameter values multiplied by a scale factor,
    wherein the listen channel is included in the plurality of social channels,
    wherein the probe request frame is transmitted from each of the plurality of social channels, and
    wherein the probe response message is received within a predetermined hold time after the probe request message is transmitted.

2. The method of claim 1, wherein the predetermined hold time is set differently for each of the plurality of social channels.

3. The method of claim 1, wherein the plurality of social channels includes two channels.

4. The method of claim 1, wherein:
    when the first device is determined to be the group owner, the method further comprises scanning an optimal operating channel that is to perform communication with the second device; and
    the scanning operation is performed by only the first device.

5. The method of claim 4, the method further comprises:
    transmitting channel information related to the optimal operating channel that is to perform communication as a result of the channel scan; and
    changing a channel for communication to the optimal operating channel.

6. The method of claim 1, wherein the first device is determined to be the group owner when the first intent value is greater than the second intent value.

7. The method of claim 1, wherein the determining operation comprises:
    comparing the first random value and the second random value when the first intent value and the second intent value are identical,
    wherein a first device is determined to be the group owner when the first random value is greater than the second random value.

8. The method of claim 1, wherein the first intent value and the second intent value are determined by at least one of state of each device or surroundings.

9. The method of claim 1, the method further comprises transmitting a group owner negotiation confirmation message to the second device.

10. The method of claim 1, wherein the specific parameter values are values that digitize an influence to at least one of states or surroundings of each of the first device and the second device.

11. An apparatus for performing communication using Wi-Fi between a first device and a second device, the first device comprising:
    a communication unit configured to transmit and receive signals externally in at least one of: a wired manner and a wireless manner; and
    a control unit operatively connected to the communication unit and configured to:
        control the communication unit to transmit a probe request frame through one channel among a plurality of social channels, receive a probe response frame from the second device in response to the probe request frame in a listen state, control the communication unit to transmit a group owner negotiation request frame that includes a first group owner negotiation information to the second device;

receive a group owner negotiation response frame that includes a second group owner negotiation information in response to the group owner negotiation request frame from the second device, determine a group owner using the first group owner negotiation information and the second group owner negotiation information, wherein the first group owner negotiation information includes a first intent value and a first random value, wherein the second group owner negotiation information includes a second intent value and a second random value, wherein the first intent value and the second intent value are determined by specific parameter values multiplied by a scale factor, wherein the listen channel is included in the plurality of social channels, wherein the probe request frame is transmitted from each of the plurality of social channels, and wherein the probe response message is received within a predetermined hold time after the probe request message is transmitted.

12. The apparatus of claim 11, wherein the predetermined hold time is set differently for each of the plurality of social channels.

13. The apparatus of claim 11, wherein the plurality of social channels includes two channels.

14. An apparatus for determining a group owner between a first device and a second device in a Wi-Fi Direct system, the first device comprising:

a communication unit configured to transmit and receive signals externally in at least one of: a wired manner and a wireless manner; and a control unit operatively connected to the communication unit and configured to:

control the communication unit to transmit a group owner negotiation request frame that includes a first group owner negotiation information for group owner negotiation to the second device, receive a group owner negotiation response frame that includes a second group owner negotiation information in response to the group owner negotiation request frame from the second device, negotiate a group owner based on the first group owner negotiation information and the second group owner negotiation information, wherein the first group owner negotiation information includes a first intent value and a first random value, wherein the second group owner negotiation information includes a second intent value and a second random value, wherein the first intent value and the second intent value are determined by at least one of state of each device and surroundings, and wherein the first intent value and the second intent value are determined by specific parameter values multiplied by a scale factor.

* * * * *